Feb. 14, 1961 A. J. FINDLAY ET AL 2,971,811

TIME DATA RECORDING APPARATUS

Filed Nov. 25, 1957 18 Sheets-Sheet 1

Inventor
ALBERT JAMES FINDLAY deceased
By EDITH JESSIE FINDLAY executrix
By [signature]
Attorney Inventor
ALBERT JAMES FINDLAY deceased
By EDITH JESSIE FINDLAY executrix
By [signature]
Attorney Inventor
ALBERT JAMES FINDLAY deceased
By EDITH JESSIE FINDLAY executrix
By [signature]
Attorney Inventor
ALBERT JAMES FINDLAY deceased
By EDITH JESSIE FINDLAY executrix
By [signature]
Attorney Feb. 14, 1961

A. J. FINDLAY ET AL 2,971,811

TIME DATA RECORDING APPARATUS

Filed Nov. 25, 1957

18 Sheets-Sheet 5

Inventor
ALBERT JAMES FINDLAY deceased
By EDITH JESSIE FINDLAY executrix
By [signature]
Attorney Feb. 14, 1961 A. J. FINDLAY ET AL 2,971,811

TIME DATA RECORDING APPARATUS

Filed Nov. 25, 1957 18 Sheets-Sheet 6

Inventor
ALBERT JAMES FINDLAY deceased
By EDITH JESSIE FINDLAY executrix
By [signature]
Attorney Feb. 14, 1961

A. J. FINDLAY ET AL 2,971,811

TIME DATA RECORDING APPARATUS

Filed Nov. 25, 1957

18 Sheets-Sheet 7

Inventor
ALBERT JAMES FINDLAY deceased
By EDITH JESSIE FINDLAY executrix

By [signature]
Attorney

Feb. 14, 1961 A. J. FINDLAY ET AL 2,971,811

TIME DATA RECORDING APPARATUS

Filed Nov. 25, 1957

18 Sheets-Sheet 8

Inventor
ALBERT JAMES FINDLAY deceased
By EDITH JESSIE FINDLAY executrix
By [signature]
Attorney Inventor
ALBERT JAMES FINDLAY deceased
By EDITH JESSIE FINDLAY executrix
By [signature]
Attorney Feb. 14, 1961 A. J. FINDLAY ET AL 2,971,811

TIME DATA RECORDING APPARATUS

Filed Nov. 25, 1957 18 Sheets-Sheet 10

Inventor
ALBERT JAMES FINDLAY deceased
By EDITH JESSIE FINDLAY executrix

By [signature]

Attorney

Feb. 14, 1961 A. J. FINDLAY ET AL 2,971,811

TIME DATA RECORDING APPARATUS

Filed Nov. 25, 1957 18 Sheets-Sheet 11

Inventor
ALBERT JAMES FINDLAY deceased
By EDITH JESSIE FINDLAY executrix

By [signature]
Attorney

Feb. 14, 1961 A. J. FINDLAY ET AL 2,971,811

TIME DATA RECORDING APPARATUS

Filed Nov. 25, 1957

18 Sheets-Sheet 12

Inventor
ALBERT JAMES FINDLAY deceased
By EDITH JESSIE FINDLAY executrix
By [signature]
Attorney Inventor
ALBERT JAMES FINDLAY deceased
By EDITH JESSIE FINDLAY executrix
By [signature]
Attorney Feb. 14, 1961 A. J. FINDLAY ET AL 2,971,811

TIME DATA RECORDING APPARATUS

Filed Nov. 25, 1957 18 Sheets-Sheet 14

Inventor
ALBERT JAMES FINDLAY deceased
By EDITH JESSIE FINDLAY executrix
By [signature]
Attorney Feb. 14, 1961 A. J. FINDLAY ET AL 2,971,811

TIME DATA RECORDING APPARATUS

Filed Nov. 25, 1957 18 Sheets-Sheet 15

Inventor
ALBERT JAMES FINDLAY deceased
By EDITH JESSIE FINDLAY executrix
By [signature]
Attorney Feb. 14, 1961 A. J. FINDLAY ET AL 2,971,811

TIME DATA RECORDING APPARATUS

Filed Nov. 25, 1957 18 Sheets-Sheet 16

Inventor
ALBERT JAMES FINDLAY deceased
By EDITH JESSIE FINDLAY executrix

By Alan [signature]
Attorney

Feb. 14, 1961 A. J. FINDLAY ET AL 2,971,811

TIME DATA RECORDING APPARATUS

Filed Nov. 25, 1957 18 Sheets-Sheet 17

Inventor
ALBERT JAMES FINDLAY deceased
BY EDITH JESSIE FINDLAY executrix

By [signature]
Attorney

Inventor
ALBERT JAMES FINDLAY deceased
By EDITH JESSIE FINDLAY executrix
By [signature]
Attorney United States Patent Office 2,971,811

Patented Feb. 14, 1961

2,971,811

TIME DATA RECORDING APPARATUS

Albert James Findlay, deceased, late of Montreal, Quebec, Canada, by Edith Jessie Findlay, executrix, Montreal, Quebec, Canada, and George C. Widdup, Valleyfield, Quebec, Canada, assignors to Canadian Patents and Development Limited, Ottawa, Ontario, Canada, a company Filed Nov. 25, 1957, Ser. No. 698,718

5 Claims. (Cl. 346—86)

The present invention relates to time recording apparatus and more specifically to apparatus of this nature which automatically records elapsed time on a time card.

While there are many and varied types of time recording machines available at the present time, there is still a demand for a time recorder capable of preparing a card in a form which will enable a tabulating machine to automatically extend and compute both time elapsed and money values based on the elapsed time for both job cost and payrolls. Heretofore, it has always been necessary to obtain from the usual time recording apparatus the starting time and the finishing time, compute the elapsed time, and then compute the result in hours and minutes worked on any assignment with respect to an hourly rate to obtain the money value. Thus, for example, the known type of time recording machine in general use provides the punching at an appropriate point of a card printed with divisions representing hours and minutes, the result being read by a worker who must subtract the starting time from the finishing time and calculate the wages due for the elapsed time manually or by machine.

A further problem, which exists in connection with the recording of elapsed time in connection with costing operations, is that it is quite often necessary to identify the project or job to which the elapsed time should be charged, for example, it has been usual to apply a separate job number or the like to the time card to specifically indicate where the elapsed time was applied. In some cases, the job or designated number may remain the same on a time card for a considerable length of time, or in the case of manufacturing factories it is quite often necessary to apply several job numbers to the time card for a single day. This is quite often done manually and in any case requires a separate operation, generally in a different point, from the elapsed time recording operation. Still further, it is often necessary to indicate on a time card further data with respect to rates, employee's records or the like, which is necessary in the final analysis of the sorting of the time cards for final computing of payrolls.

At the present time, a considerable amount of computing, recording and sorting is accomplished by tabulating machines, but in order that the card be suitable for use in such machines, any supplementary data in addition to the elapsed time record must be either first applied to the card or applied to the card by a separate operation, apart from the time recording operation usually performed by the employee.

The present invention aims to provide a time evaluating apparatus which embodies means whereby elapsed time is automatically indicated by punching holes in the card designed for this purpose. In addition, means are provided whereby any desired additional code data can be punched in the card simultaneously with the time elapsed recording in such a manner that the card is adapted to a subsequent direct use in conjunction with certain British and American types of tabulating machines. In addition, means are also embodied whereby a visual record of elapsed time is printed on the card so as to provide a visual check for the employee or supervisory staff if required.

Accordingly, the present invention relates to a time recording apparatus which includes means for automatically obtaining elapsed time by punching holes in a card designed for this purpose or otherwise marking a card in a manner adapted to be sensed by a particular tabulating machine. In the preferred construction of the present apparatus, means are provided whereby sets of punches are individually selected as time progresses so that when a card is inserted the elapsed time is automatically recorded in a form suitable for computation by automatic tabulating apparatus.

The present apparatus also embodies means whereby certain code data can be set up manually prior to the insertion of the card, for example a job number or other clasisfying data in the form of a further series of punches which, when the time card is passed through the machine for recording the elapsed time, also automatically punches the card to include the supplementary data required. Still further, means are provided whereby a printed record of the elapsed time, in synchronisation with the elapsed time punching record, is applied to the card to give a visual indication as to the elapsed time recorded.

In the construction of the present apparatus, it is essential to have extreme accuracy in locating the consecutive perforations in the card so that they will function accurately in the tabulating machines utilized for further computations stemming from the time recording or additional indicating punched data. In the present apparatus, this is accomplished by the co-action of a card-guiding means, in a series of selectively driven rollers which operate in conjunction with an electrical sensory operated card-locating device. In general terms, it may be stated that the card-guiding means supports the card and maintains it in exact alignment during its passage through the time recording machine, that the card-locating device acts to stop the card at the exact location which permits the punch to perforate it in the correct aligned positions, and that the rollers are adapted to exert no force upon the card at the time of the punching operation. Simultaneously with the elapsed time punching operation and in conjunction with the electrical sensory operated card-locating device mentioned above, means are also provided whereby a consecutive locating perforation is punched in the correct alignment and spacing for the subsequent punching operation. In addition, any supplementary designating data pre-set up prior to the punching operation is also punched in the card in the correct and exact alignment required for sorting or further operations by tabulating machines. The present machine is constructed so that all of these operations take place automatically and while the card is out of the reach of the employee. The exact manner in which these various operations are carried out and the manner in which the required extreme accuracy of the card perforating is ensured will be discussed in more detail later.

This application is a continuation-in-part of U.S. patent application Serial Number 503,302 filed April 22, 1955, now Patent No. 2,838,361, issued June 10, 1958.

Having thus generally described the nature of the invention, particular reference will be made to the accompanying drawings wherein there is shown by way of illustration a preferred embodiment of a time recording apparatus in accordance with the invention, and in which.

Figure 2:
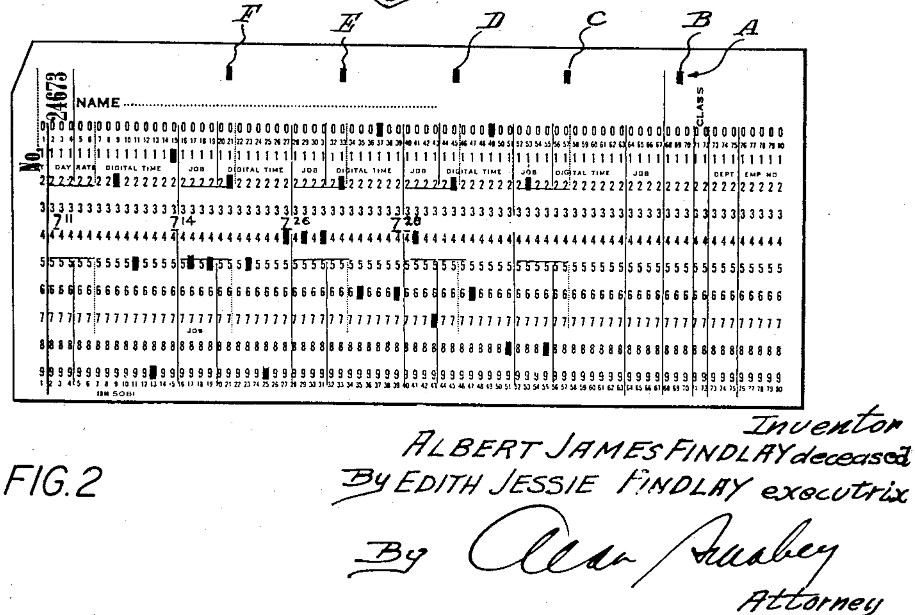
Figure 2 is a diagrammatic showing of a sample time card adapted for use in combination with the present apparatus.
Figure 3:
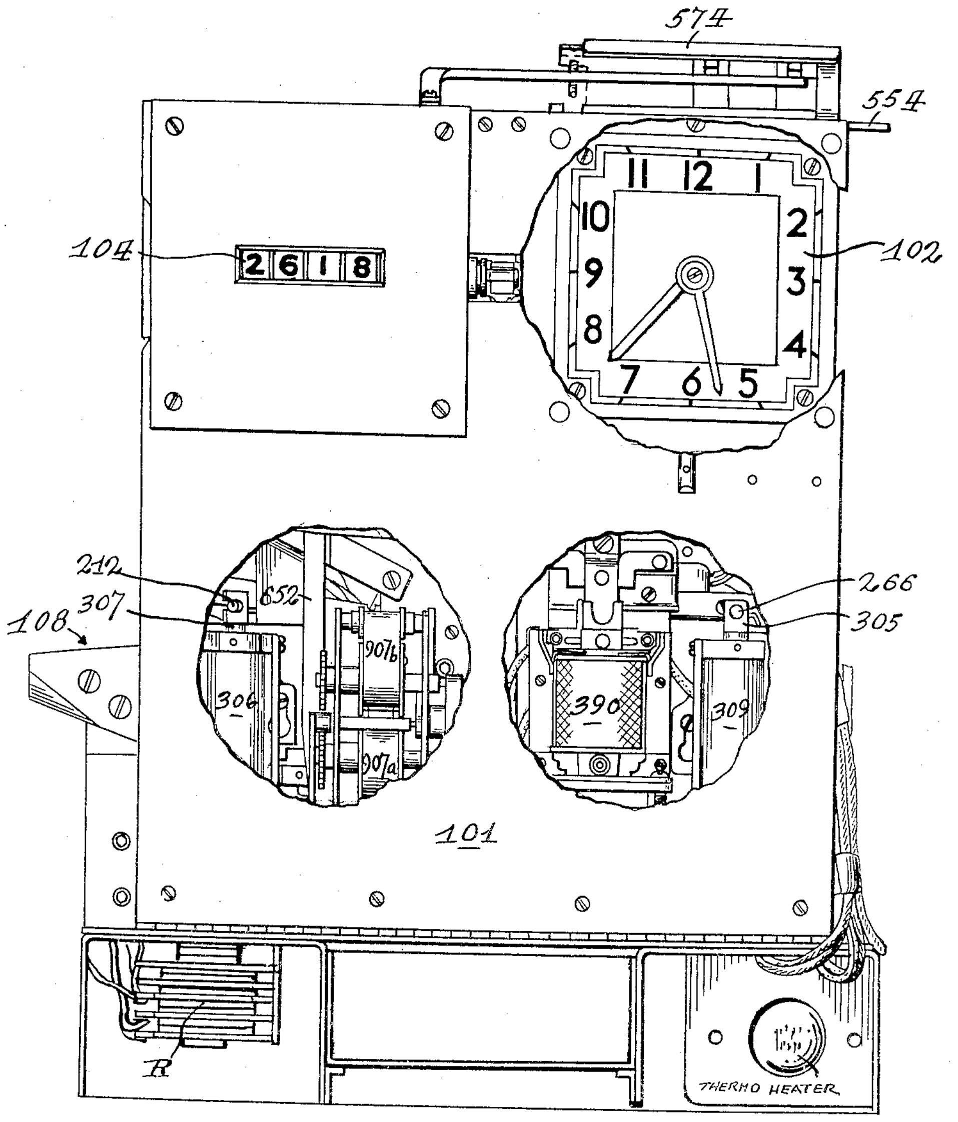
Figure 3 is a front view of the apparatus, as shown in Figure 1, with the cover removed to show the inner construction more clearly.

For the purposes of explaining the operation of the apparatus of the invention and as an example of a punch card suitable for use in combination with the present apparatus, Figure 2 shows a typical card. The sample card shown in Figure 2 is ruled off to provide a plurality of spaced columns giving starting and stopping times and intervening these columns additional columns are provided to indicate specific data relating to the elapsed time recorded, for example in the card shown columns are provided for the marking of a job number which can be applied to the card at the time of punching by the apparatus. Provision is also made in the card illustrated for indicating departmental classifications. It should be explained at this time that the present apparatus is designed to operate on the basis of recording elapsed time by a system of one minute periods, these periods starting from zero at any pre-arranged time during a calendar or fiscal year, the machine being adaptable to be re-set to zero daily at the start of the official starting time every morning, if desired. The use of the calculation of hours and minutes by a system of one minute periods from any desired zero eliminates the difficulties previously encountered with extending time records when it is recorded in hours and fractions thereof, for example, minutes or decimals, e.g., 8:30–12:45, making an elapsed time of 4 hours and 15 minutes, which complicates future calculations since they must be reduced to minutes for the calculation of elapsed time. With the present apparatus the readings are given in an accumulation of minutes which make it possible to maintain an identical time record throughout an entire system.

Again with reference to Figure 2, in the sample card shown in the first part of the card the starting time is given as 2,591 which is minutes; then in the next column the punched time is 2,594, making the elapsed time 3 minutes. It will be noted that the job number punched is 55 so that this elapsed time of 3 minutes would be applied to job number 55, the sorting of the cards to jobs or other desired classifications being a simple matter by the tabulating and sorting machines presently available.

At the same time, there is provision in the present apparatus whereby a visible record is printed in hours and minutes. It will be noted that in the example shown the printed record is printed along approximately a central horizontal space. It will be appreciated that this visual time record can be printed either on the bottom or top margin of the card or in fact on any location desired, depending on the arrangement of the specific card and the disposition of the time printing device relative to the card-guiding chute of the apparatus. The first row of holes indicated at A contains those holes which serve to locate the card accurately within the apparatus; the first hole B being pre-punched for this purpose and the holes C, D and F, being punched in correct spaced apart sequence by the apparatus. The location of the first hole B is of prime importance since it serves to initially register the card in punching position relative to the pre-printed columns ruled on the card.

In order that the operation and construction of the present time recording apparatus may be more clearly understood it will now be described in more detail with reference to the accompanying drawings.

Figure 1:
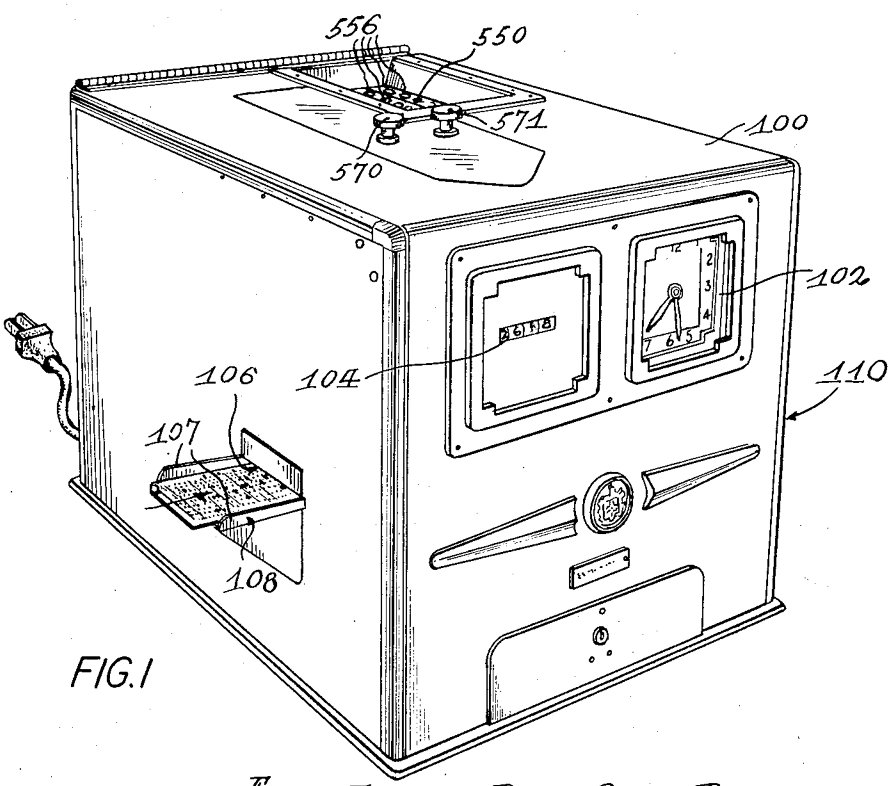
Figure 1 is a front view in perspective elevation of a preferred construction illustrating the appearance of the front, side and top panels.

With reference to Figure 1 of the drawings, the preferred construction shown has an outside casing or housing 100 which is provided with a clock dial 102 showing the actual time and a numerical indicator 104 showing the elapsed time in minutes from a zero datum.

Figure 11:
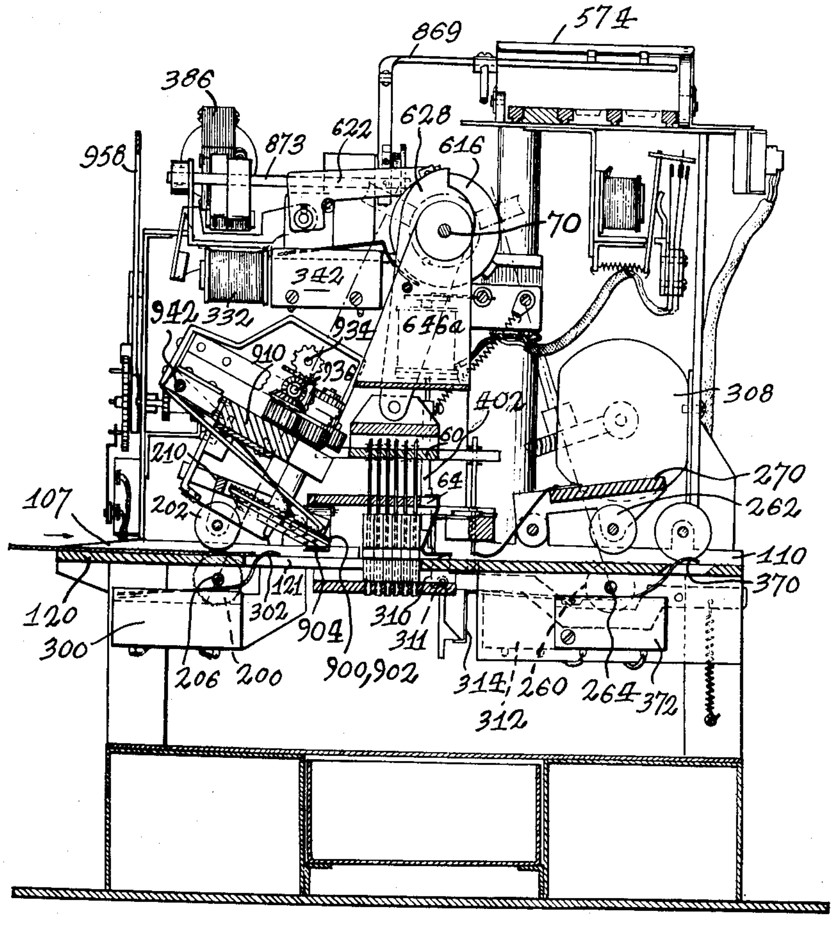
Figure 11 is a cross-sectional view of the construction shown in Figure 4 along the line 11—11 which is substantially midway of the card-guiding chute, to illustrate in more detail the relative disposition and construction of the card printing means and the controlling mechanism therefor.

The housing 100 is provided with a time card receiving slot 106 having an attached entry tray 108 with a corresponding card exit slot 110 disposed at the other side of the machine. The card entry and card exit slots are located at opposite ends of a guideway or card-supporting base 120 extending completely through the machine, see Figure 11. It is upon this guideway that the card is supported and moved in a continuous aligned path into alignment with and from the various punching elements applying the record to the card.

*Operation upon card insertion*

The prepared card, for example the card shown in Figure 2, is inserted in the card receiving slot 106 between the side walls 107 of the card entry tray 108. The card entry tray 108 is an extension or continuation of the card supporting base 120 and the side walls 107 continue along the length of the base 120 so as to define therebetween a card receiving space of fixed width extending from side to side of the machine, see Figures 11 and 12. The spacing between the side walls is maintained at a fixed dimension so that the card can slidably pass therebetween without lateral play. This is essential to ensure the accuracy of alignment of the card during the punching operations which must be extremely accurate in view of the subsequent use of the card in a tabulating machine.

The leading edge of the card, when so inserted, passes between a first set of opposed card advancing rollers 200, 202 and contacts a switch contact member 302 which extends into the guided path of the card through a slot 121 in the base plate 120. The rollers 200, 202 which act to move the card through the machine will be presently described in more detail. It will be noted that when the card is placed within the card receiving slot and is advanced by the rollers 200, 202 it is immediately withdrawn from the reach, and consequently the control of the user. This prevents possible distortion of the card through it being forced into the machine by the user.

The contact of the card with the switch contact member 302 actuates a switch 300 which is connected to and controls a relay coil 304. The relay coil 304 is connected to solenoids 306, 309, and also to the main driving motor 308, see Figure 12. The lower pair of card advancing rollers 200 is mounted in spaced relationship on a shaft 206 which extends towards the rear of the machine and to a driven connection with the motor 308 as will be described later. The shaft 206 is journalled for rotation to the frame of the machine directly beneath the base plate 120 with the upper portion of the rollers 200 fitting into suitable slots provided in the base plate 120 so that they contact the undersurface of the card. The lower rollers 200 are fixed relative to the base plate 120 and are driven through the shaft 206 while the upper rollers 202 are journalled on a supporting bracket 210 pivotally mounted above the base plate 120. The upper rollers are moved towards and away from the base plate 120, and consequently the card guided by the plate, by the engagement of a pin 212 extending from the bracket 210 with the plunger 307 of the solenoid 306, see Figures 5 and 12.

The second set of card advancing rollers 260, 262, is of a similar construction to the rollers 200, 202. The lower rollers 260 are mounted on an elongated shaft 264 driven from the main motor 308 as will be described in more detail later. The shaft 264 is journalled for rotation to the frame of the machine directly beneath the base plate 120 with the upper portions of the rollers 260 fitting through slots provided in the base plate so that they contact the bottom of the card. The upper rollers 262 are journalled on a supporting bracket 270 pivotally mounted above the base plate 120. The upper rollers 262 are moved towards and away from the base plate 120 by the engagement of a pin 266 extending from the bracket 270 with the plunger 305 of the solenoid 309.

Accordingly, actuation of the solenoids 306, 309, brings the upper rollers 202, 262, towards the base plate 120 and since the card is between the first set of rollers 202, 200, it is pressed into contact with the driven rollers 200 and carried along the base plate 120 until the leading edge contacts and depresses a toggle arm 310 pivotally mounted beneath the base plate 120. The movement of the toggle arm 310, through a pivotally connected latch portion 311, depresses a contact arm 314 of a toggle switch 312, see Figure 11. The toggle switch 312 is connected to a sensing coil 400 which when energized moves a core 404 downwardly causing a sensing pin 402 to descend into resilient contact with the surface of the card as it advances.

Figures 23, 24, 25:
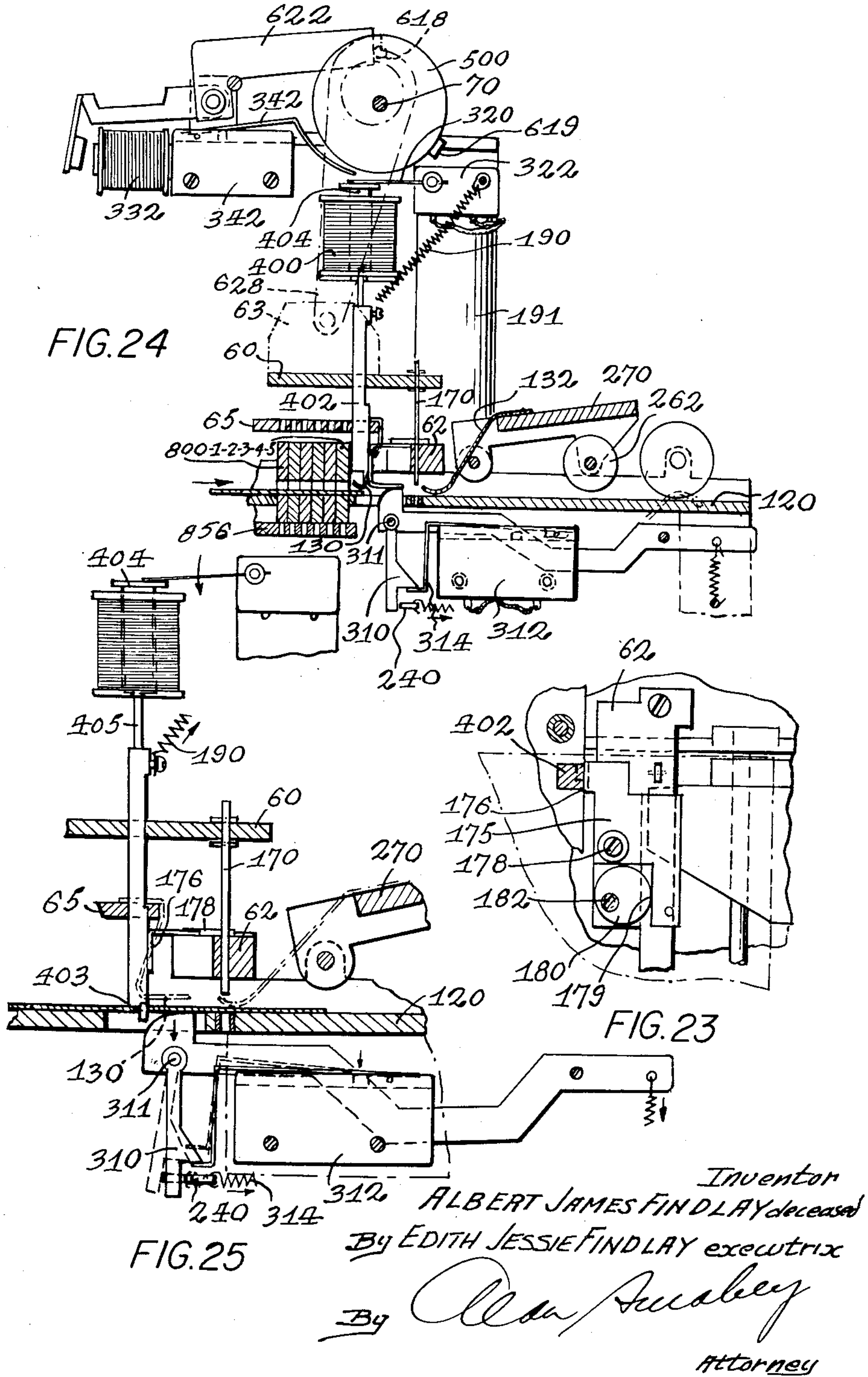
Figure 23 is a partial detail view in plan showing the location of the sensing pin and punch.
Figure 24 is a detail view of the sensing pin in combination with the clutch cam control.
Figure 25 is a further view of a portion of the apparatus shown in Figure 24 to illustrate the sensing pin in card arresting position with the card in location for punching and printing.

When the sensing pin 402 is aligned with the locating perforation in the card, see Figures 24 and 25, the influence of the coil 400 on the core 404 causes the sensing pin 402 to pass through the card and as a result the contact arm 320 of a sensing switch 322 is actuated thus closing the switch. The switch 322 is connected to a relay coil 324 which when actuated breaks the circuit to the solenoids 306, 309 so that the rollers 202 rise and release the card from forward driving pressure. At the same time the actuation of the relay coil 324 acts to close a contact switch 330 connected to a clutch actuating magnet 332. The actuation of the clutch magnet 332 causes a clutch mechanism, which will be described later, to operate the punch mechanism and the printing mechanism as it completes a cycle and thus perforate and print the necessary data on the card.

Figures 18, 19, 20, 21, 22:
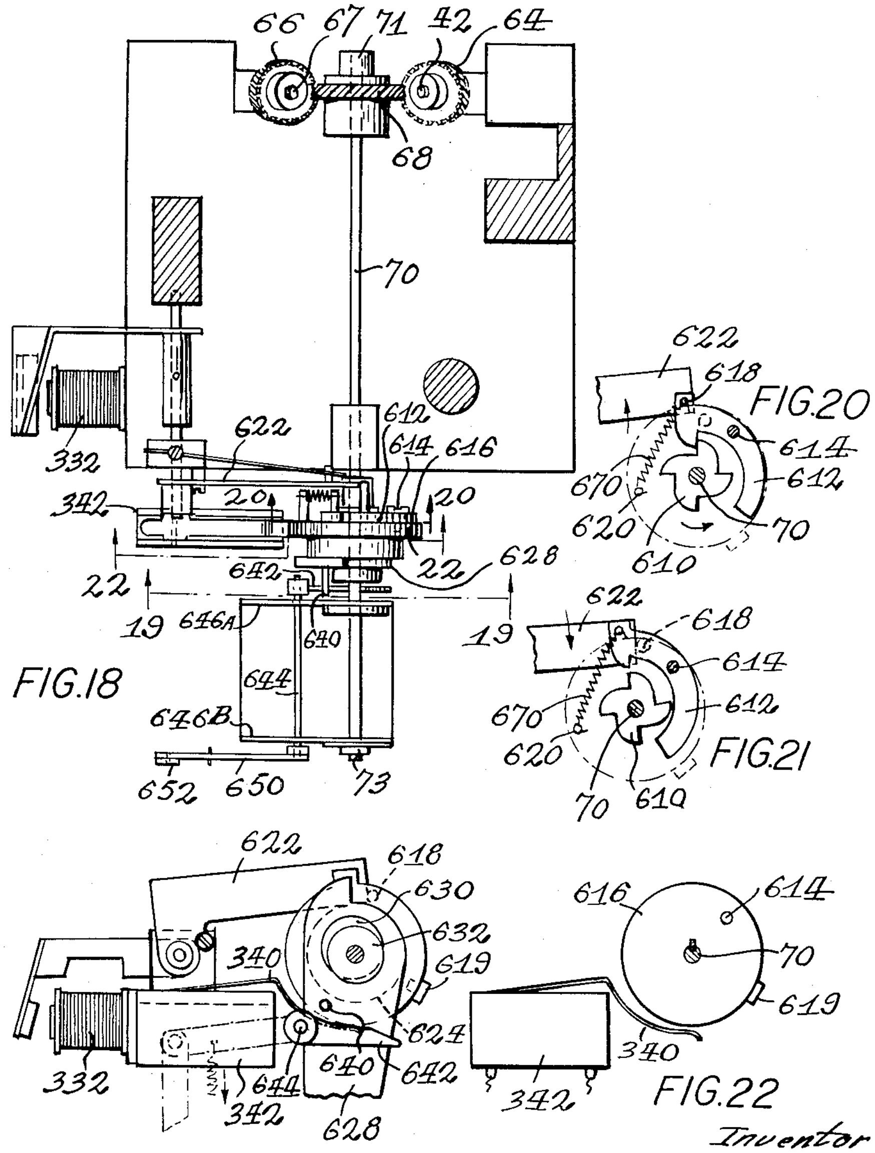
Figure 18 is a partial plan view of the driving mechanism operating the punch pressure plate.
Figure 19 is an enlarged detail view of a portion of Figure 18 along the line 19—19 to illustrate the clutch mechanism of the punch plate driving mechanism and the controlling solenoid.
Figure 20 is an enlarged detail view of a portion of Figure 18 along the line 20—20 to show the release escapement for the clutch in engaged position.
Figure 21 is a view corresponding to Figure 20 showing the escapement for the clutch in normal released position.
Figure 22 is an enlarged detail view of a portion of Figure 18 along the line 22—22 to show the kick-off switch controlled by the clutch cam.

The operation of the clutch cam 616 momentarily operates the contact 340 of a switch 342 which is connected to and operates a kick-off solenoid 350, see Figures 22, 24. The kick-off solenoid 350 actuates a pivotally mounted kick-off lever arm 240 which contacts and releases the latch portion 311 of the toggle arm 310 from contact with the contact arm 314 of the toggle switch 312 opening the circuit and releasing the sensing rod coil 400. This causes the sensing pin 402 to emerge from the card releasing it for further advance. The release of the sensing rod coil 400 also causes the core 404 to rise under the influence of a coil spring 190 so that the contact member 320 of the switch 322 is operated, and through the relay 324, breaks the circuit to the clutch magnet 332 and restores the circuit to the solenoids 306, 309.

The actuation of the solenoid 309 brings the upper card contacting rollers 262 downwardly into contact with the card pressing it against the driven lower rollers 260 so that the card is again moved forward. A third card actuated switch contact member 360 extends from a switch 362 into the path of the advancing card. The switch 362 is connected to and also controls the relay 304 and it is spaced from the toggle arm 310 so that the leading edge of the card contacts the third switch member 360 before the trailing edge clears the toggle arm 310. Accordingly, the solenoids 306, 309 and the motor 308 remain energized until the card has advanced to the card exit slot 110. The switch contact member 360 is located between a pair of fixed pressure rollers 280 which are mounted for free rotation on a shaft 281 journalled in standards 282 directly above the base plate 120, see Figures 11 and 12. Removal of the card from the exit slot 110 releases the switch contact member 360 and restores the relay coil 304 to normal breaking the circuit to the main motor 308 and rollers.

*Roller driving mechanism*

Figure 9:
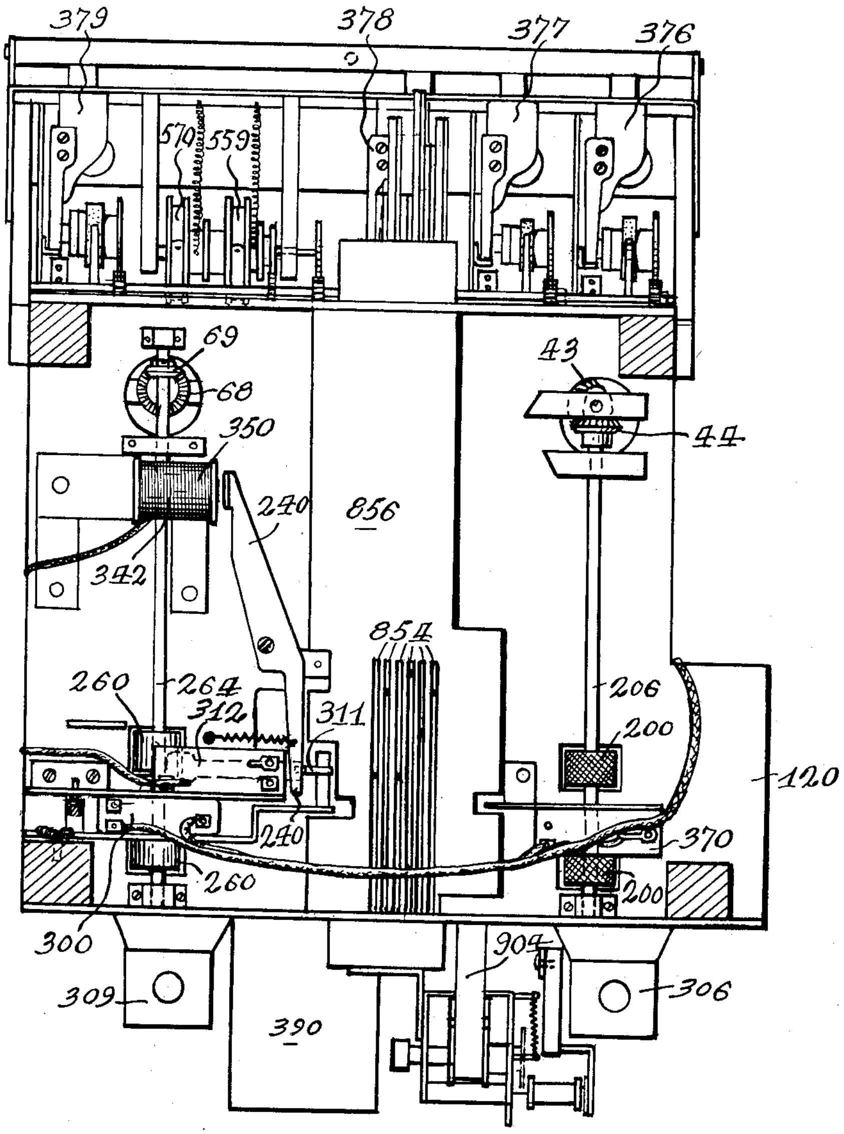
Figure 9 is a bottom plan view of the apparatus.
Figure 10:
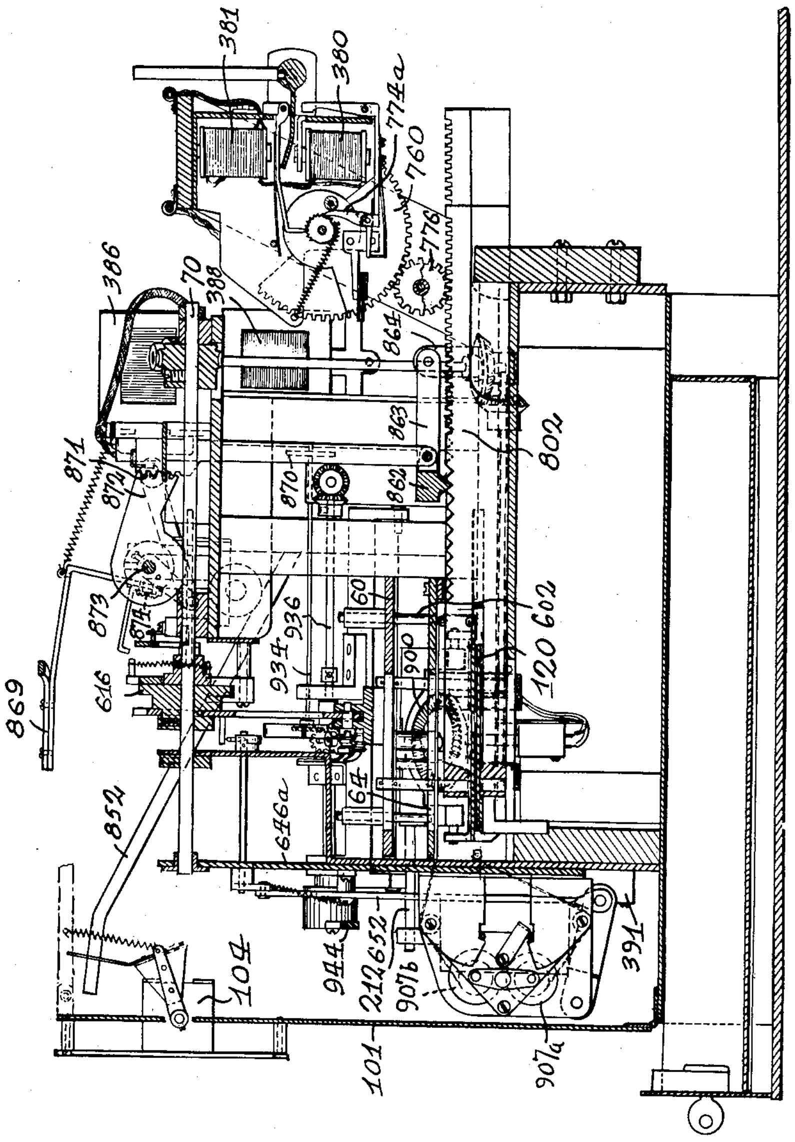
Figure 10 is a cross-sectional view partially in section of the construction shown in Figure 4 along the line 10—10 to illustrate in more detail a typical arrangement of a punch-holding rack and the punch advancing mechanism.
Figure 12:
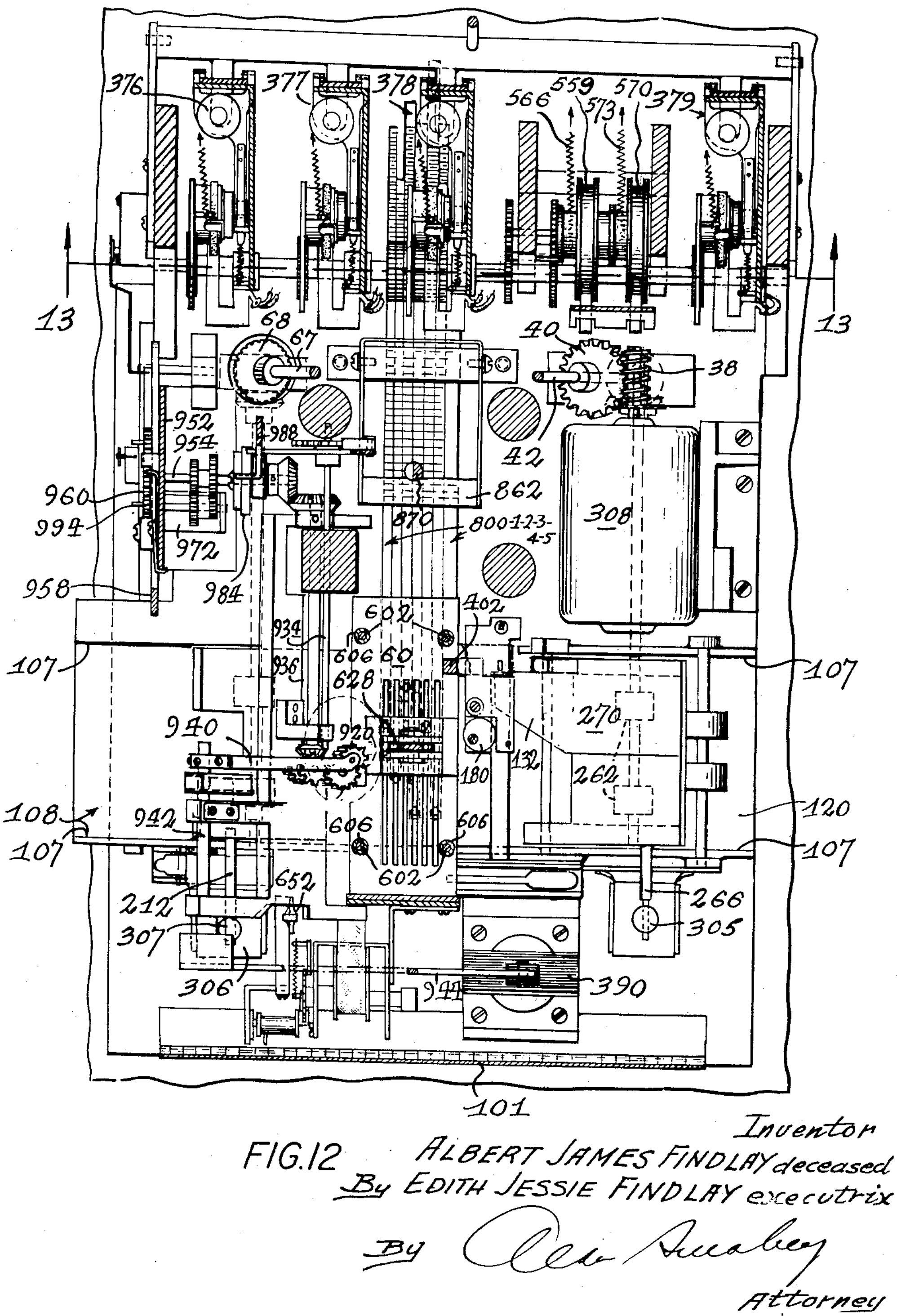
Figure 12 is a sectional view in plan along the line 12—12 of Figure 6 to show the relative position of the controlling elements and drive for printing mechanism.

To more fully describe the drive from the motor 308 to the roller shafts 206, 264, reference will be made to Figures 9, 10 and 12. As shown most clearly in Figure 12, a worm 38 is secured to the shaft of the motor 308 and is in meshed engagement with a worm wheel 40 mounted on a shaft 42 extending obliquely upwards from the base of the apparatus. Also attached to the shaft 42 is a bevel gear 43 which is in meshed engagement with a further bevel gear 44 mounted on the end of the roller shaft 206. A corresponding drive is applied to the roller shaft 264 through an oblique shaft 67 and bevel gears 68, 69. The bevel gear 69 is connected to the roller shaft 264, see Figure 9. The drive is transmitted from the upper end of the shaft 42 to the shaft 67 through a spiral gear 64 which is in meshed engagement with a large spiral gear 68 mounted on a shaft 70. The large spiral gear 68 in turn is in meshed engagement with a further spiral gear 66 mounted on the upper end of the shaft 67, see Figure 18.

*Card sensing mechanism*

As previously mentioned, the card is aligned and arrested in aligned condition through the card sensing pin 402 being placed in resilient contact with and locating and passing through one of the preperforated holes B, C, D, E, etc., in the card. To be more specific, the sensing pin 402, as shown most clearly in Figures 24 and 25, is supported for accurate sliding movement in a plate 60 of the punch actuating assembly and a lower supporting plate 62 spaced from the punch guide plate 65. As the initial locating hole "B" and the supplementary locating holes in the card shown are rectangular the end 403 of the sensing pin is correspondingly rectangular. The upper end 401 of the pin is connected to a rod 405 extending from the core 404 by a set screw 407 and the return coil spring 190 extends from the screw 407 to a supporting standard 191.

As shown most clearly in Figures 23, 24 and 25 a locating perforating punch 170, also of rectangular section, is mounted on the plate 60 in fixed spaced relationship from the sensing pin 402 in order that the next locating perforation, for example "C," be punched in the card in the exact location. The lower portion of the locating punch 170 slidably fits through a punch guide plate 171 mounted in spaced relationship over the base plate 120. As will be appreciated it is extremely difficult to maintain the exact spacing at all times between the sensing pin 402 and the locating punch 170 and therefore means are provided whereby slight adjustments may be made to this spacing. This is accomplished by having the end 403 of the sensing pin slightly smaller than the locating perforations B, C, D, etc., and providing an adjustable spacer plate 175 between the punch guide plate 171 and the lower end of the sensing pin 402. As shown most clearly in Figure 23, the spacer plate 175 includes a right-angled portion 176 which bears directly against the rear edge of the sensing pin 402, and a top portion 177 which is mounted on and is pivotally connected to the punch guide plate 171 by a collared screw 178. An eccentric disc or cam 180 is pivotally mounted on the punch guide plate 171 by a screw 182 so that it can be rotated against an inner edge 179 of the plate 175. Accordingly, through the cam 180, the plate 175 can be pivotally adjusted to bring the portion 176 towards or away from the sensing pin 402. A substantially Z-shaped spring or springs 130 is mounted on the supporting plate 62 so as to aid in the stripping of the sensing pin 402 from the card and a similar spring 132 is mounted on the roller supporting bracket 270 to aid in the stripping of the locating punch 170 from the card.

*The clutch mechanism*

The clutch mechanism as previously mentioned, controls the drive or actuation from the motor 308 to the punch operating press plate assembly which is mounted for guided reciprocal movement relative to the time selected punches of the apparatus. The fixed punch guiding plate 65 is provided with four (4) spaced posts 602 which extend upwardly from the top of the plate 65 and the punch guide plate 60, which forms the lower part of the presser plate assembly, is provided with four (4) correspondingly spaced sleeves 606 which slidably fit over the posts 602 so that the press plate assembly is guided at all four corners, see Figures 10, 11 and 12.

As previously described, the drive from the motor 308 is transmitted through the shaft 42 by gears to the large spiral gear 68 mounted on one end of the shaft 70. The shaft 70 extends between bearings 71, 73, from the rear to the front of the machine above the punching mechanism and the clutch mechanism is mounted on the other end of the shaft 70 directly above the punch operating press plate, see Figures 10, 11. As shown most clearly in Figures 18 through 22, the clutch assembly includes a ratchet 610 mounted on and keyed to the shaft 70 so that it rotates continually while the motor 308 is in operation. The ratchet 610 is partially surrounded by a ratchet pawl 612 which is pivotally mounted, as indicated at 614, to the clutch cam section 616. A spring 617, extending between a pin 618 on the ratchet pawl 612, and a pin 620 extending from the cam section 616, resiliently urges the ratchet pawl 612 inwardly towards engagement with the ratchet 610. The pin 618 on the clutch cam section 616 is adapted to come in contact with the end of a clutch control lever 622 operated by the clutch actuating magnet 332. The clutch cam section 616 also has an integral extension or boss 624 carrying an eccentric cam disc 626 and a press plate lever arm 628 having a circular opening 630, accommodating the cam disc 626, is mounted thereon for pivotal movement between the clutch extension 624 and a retaining collar 632. The clutch cam section 616, and cam disc 626 are mounted on the shaft for free rotation relative thereto and normally remain stationary while the shaft 70 rotates so that the lever arm 628 is operated in a reciprocal movement through the cam disc 626 only when the ratchet pawl 612 is released into engagement with the ratchet 610 through the release of the pin 620 from the clutch control lever 622. The control lever 622, as previously described, is actuated through the movement of the clutch actuating magnet 332 which in turn is controlled through the relay 304 activated by the descent of the sensing pin 402. The lower end of the lever arm 628 is pivotally connected to the top connecting bracket 631 of the press plate assembly.

The engagement of the ratchet pawl 612 with the ratchet 610 causes one complete revolution of the clutch assembly in a counter clockwise direction. During the first half of the revolution a projection 619 extending from the periphery of the clutch cam 616 comes into momentary contact with the switch contact member 340 and so operates the switch 342, energizing the kick-off solenoid 350 and associated circuit, as previously described in the basic operation on insertion of the card, so as to restore the contact lever arm 622 in the path of the contact pin 620. Contact of the pin 620 with the end of the lever arm 622 raises the ratchet pawl 612 from engagement with the ratchet 610 and the clutch assembly is confined to one complete revolution.

In addition to operating the punch presser plate the lever arm 628 also acts to move the printing ribbon of the card printing portion of the apparatus which will be described in detail later. A contact pin 640 extends outwardly from the face of the lever arm 628, see Figures 18 and 19, and is adapted on the reciprocal movement of the lever arm to contact a pivotally mounted lever arm 642. The lever arm 642 is mounted on a shaft 644 which is journalled for rotation between the upstanding side walls 646*a*, 646*b*, of a supporting bracket 648 which also supports the bearing 73 of the drive shaft 70. A further lever arm 650 is mounted on the other end of the shaft 644 and an elongated lever 652 is pivotally connected at one end to the lever arm 650 and extends downwardly therefrom to a connection with the ribbon rolls of the printing portion of the apparatus, see Figures 5 and 10. Accordingly, on each reciprocal stroke of the lever arm 628 the ribbon is advanced, in the manner of a typewriter ribbon, as will be described later.

*Time and data recording punches and punch selection*

As will be understood by reference to the preceding description, the travel of the card through the apparatus and the controls operated by the passage of the card are the basic functions of the apparatus to move, align and retain the card accurately in position to receive the data to be recorded on the card by the punching and printing assemblies of the apparatus. These assemblies will now be described in more detail.

Figure 5:
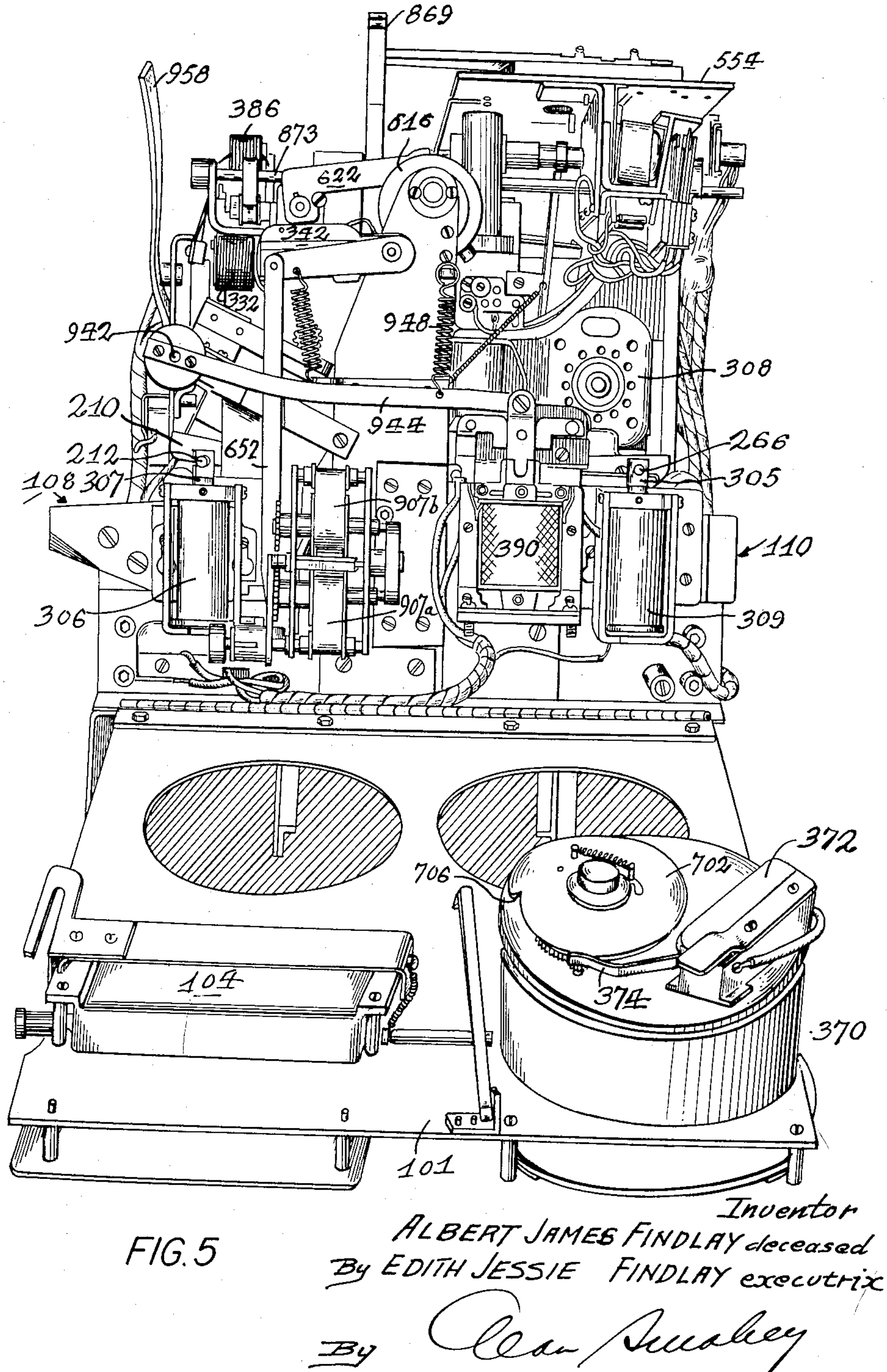
Figure 5 is a front view of the construction shown in Figure 3, with the master timing clock counter and shielding panel opened down to show the internal construction in more detail.
Figure 6:
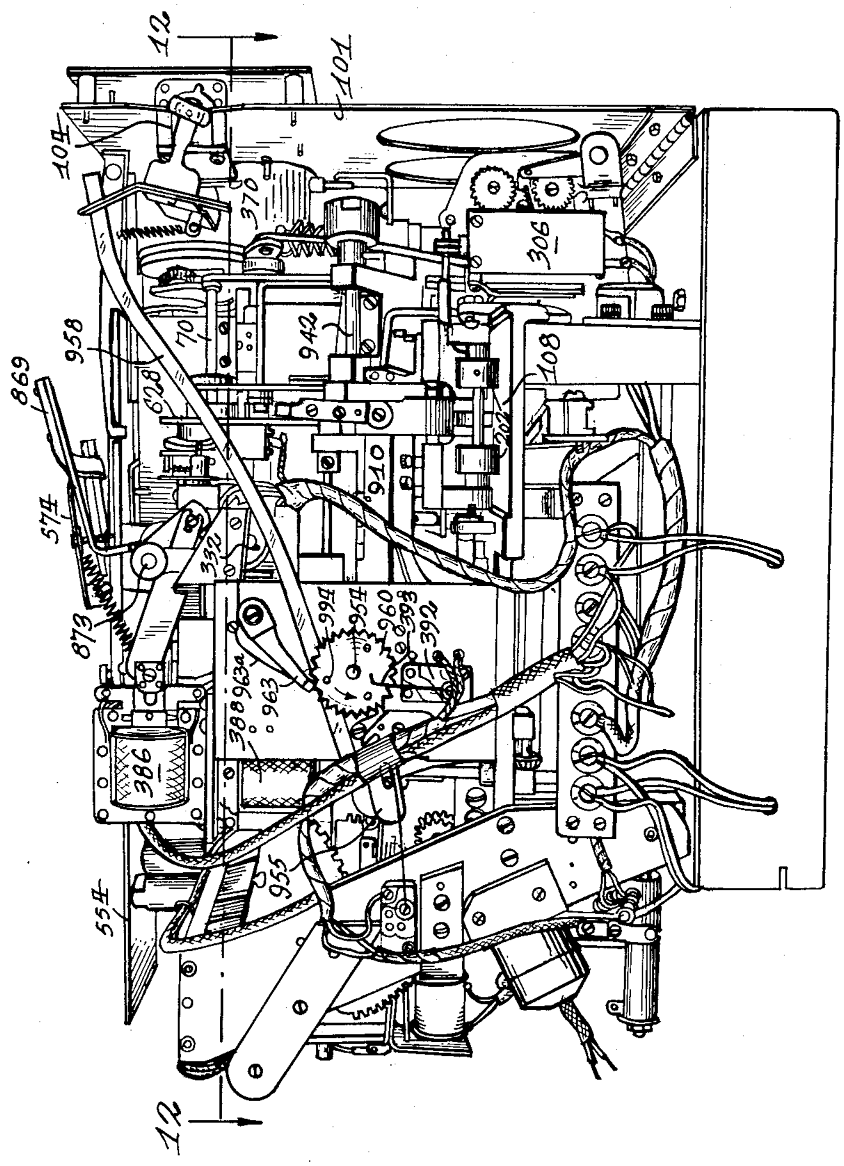
Figure 6 is a side view of the construction shown in Figure 4, as seen from the left-hand side.
Figure 7:
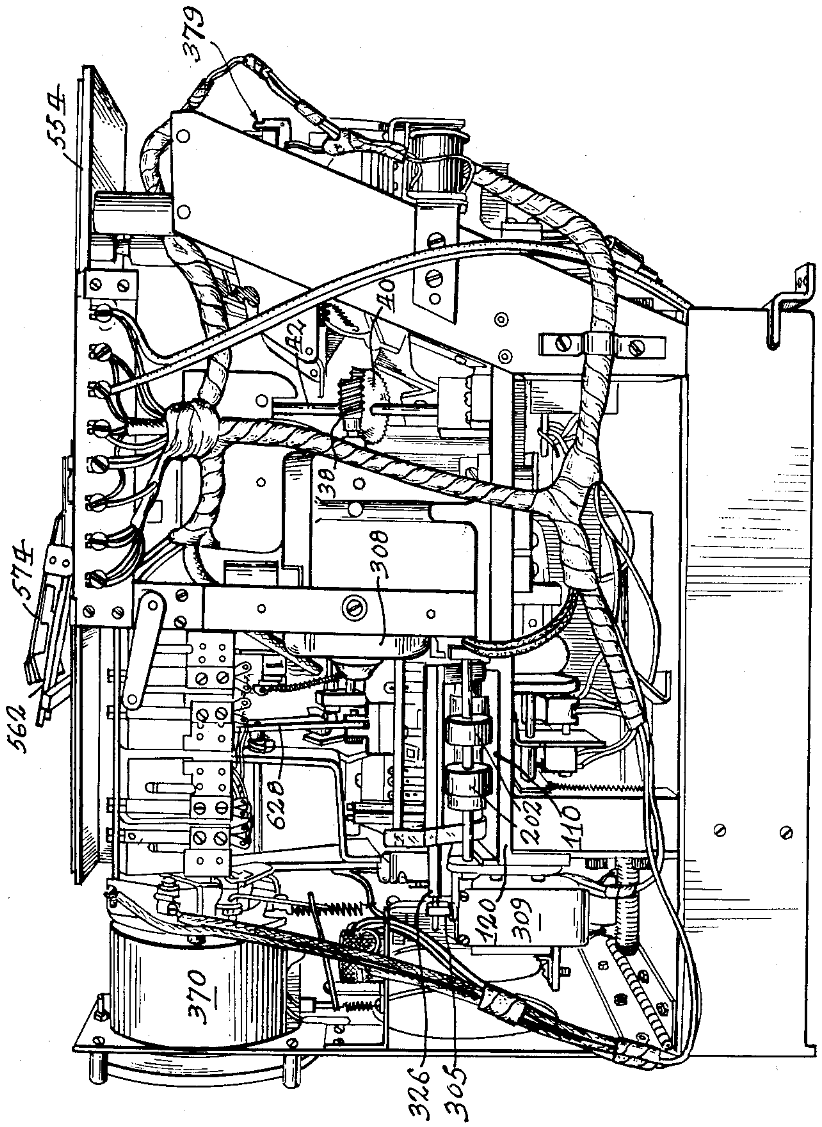
Figure 7 is a side view of the construction shown in Figure 4, as seen from the right-hand side.
Figure 8:
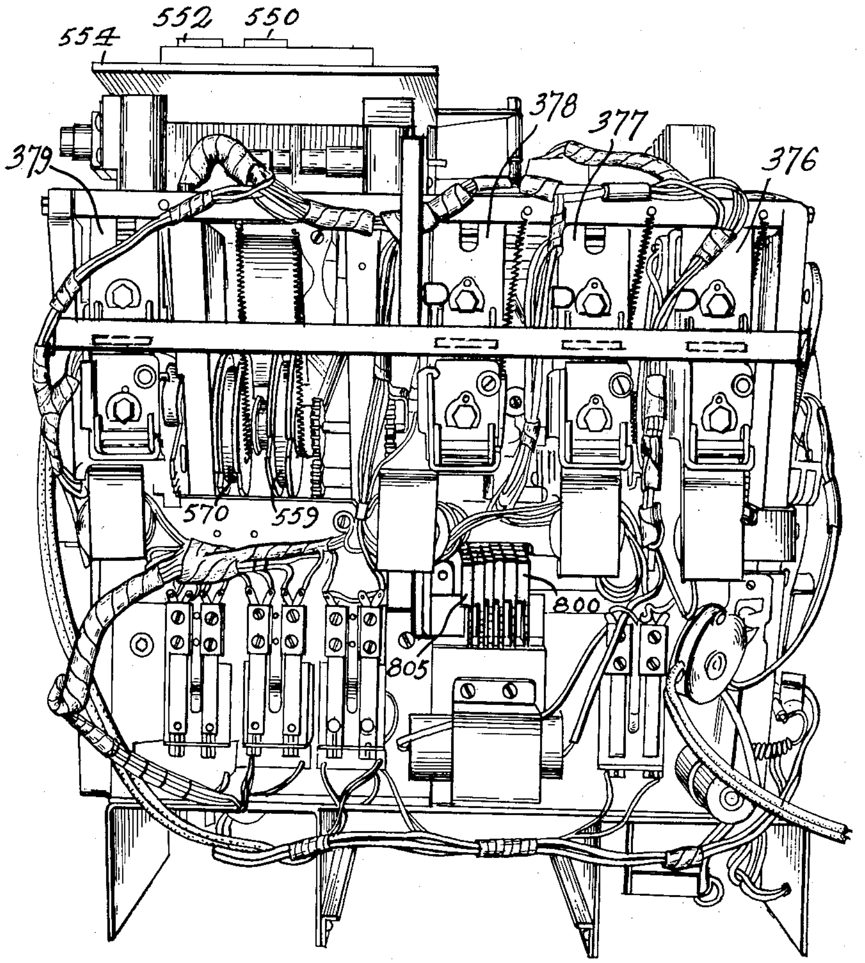
Figure 8 is a rear view of the construction as shown in Figure 4.

The main controlling element of the time recording portion of the apparatus comprises of a synchronous motor or clock 370 which in addition to driving the conventional time indicating hands showing the time on the clock dial 102 also provides a minute timed impulse to the punch selecting mechanism. With particular reference to Figure 5, the motor 370 is shown as mounted on the rear of the front casing panel 101 and is provided with a cam disc 702 driven by intermediate gears directly from the shaft of the motor to have a rotational speed of exactly 1 revolution per minute. A micro-switch 372 is mounted on the casing of the motor 370 and is provided with a contact arm 374 which is in resilient contact with the peripheral surface of the cam disc 702. The peripheral surface of the cam disc 702 includes a sharp decline or cam notch 706 so that as the switch contact arm 374 passes over this notch the micro-switch 372 is actuated and sends an energizing impulse to a first punch rack advancing coil assembly 376.

Figure 13:
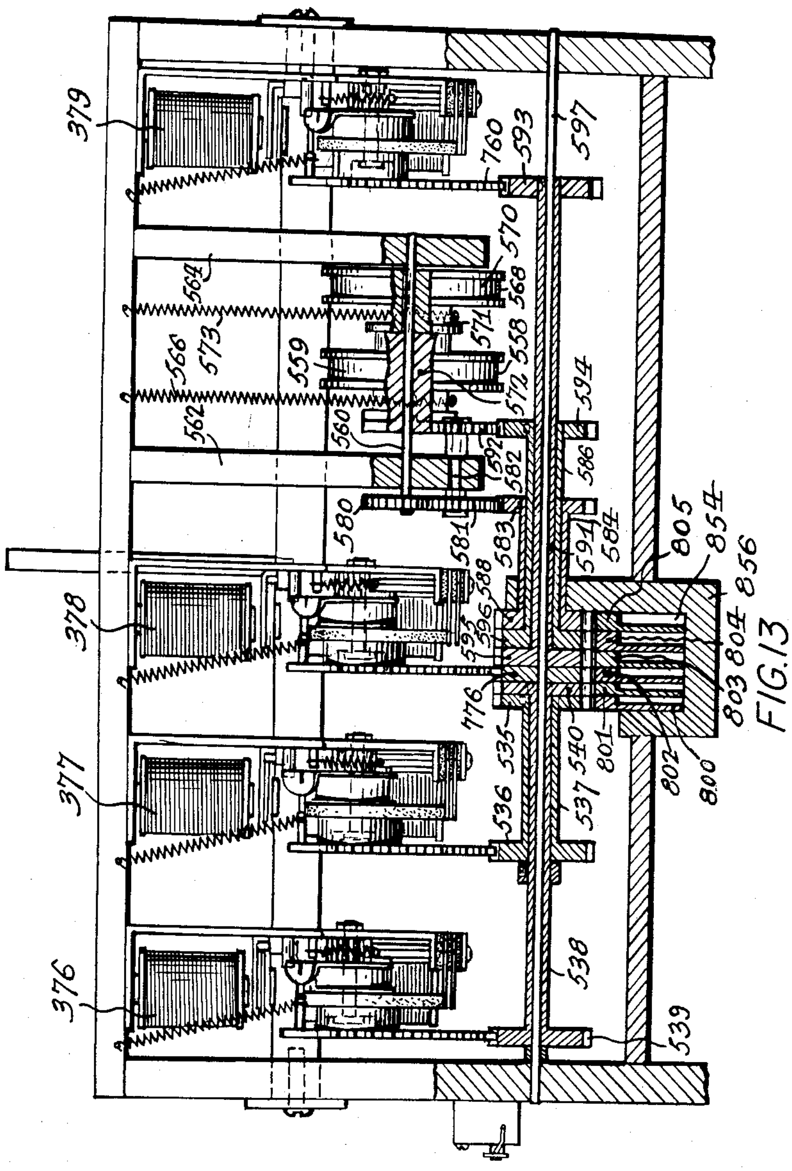
Figure 13 is a sectional view of Figure 12 along the line 13—13 to illustrate the selecting mechanism in more detail.
Figure 14:
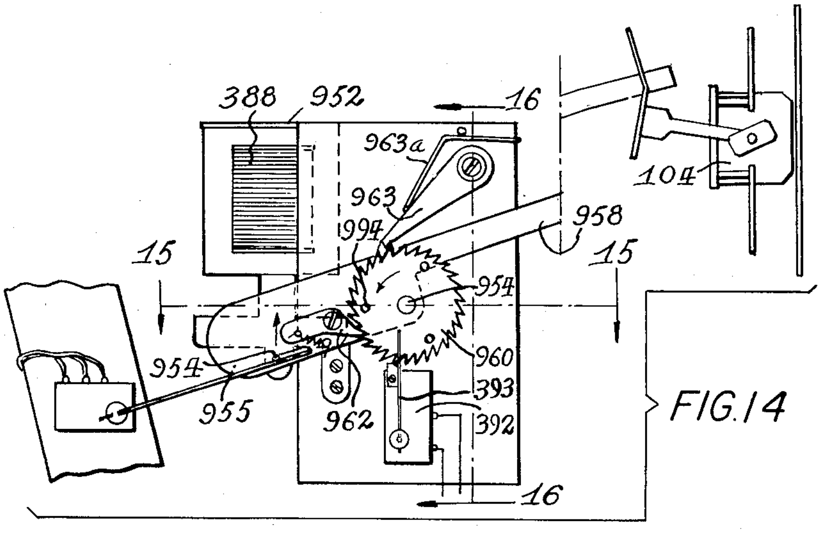
Figure 14 is an enlarged diagrammatic view of the minute impulse driving mechanism for the printing arrangement.
Figures 15, 16, 17:
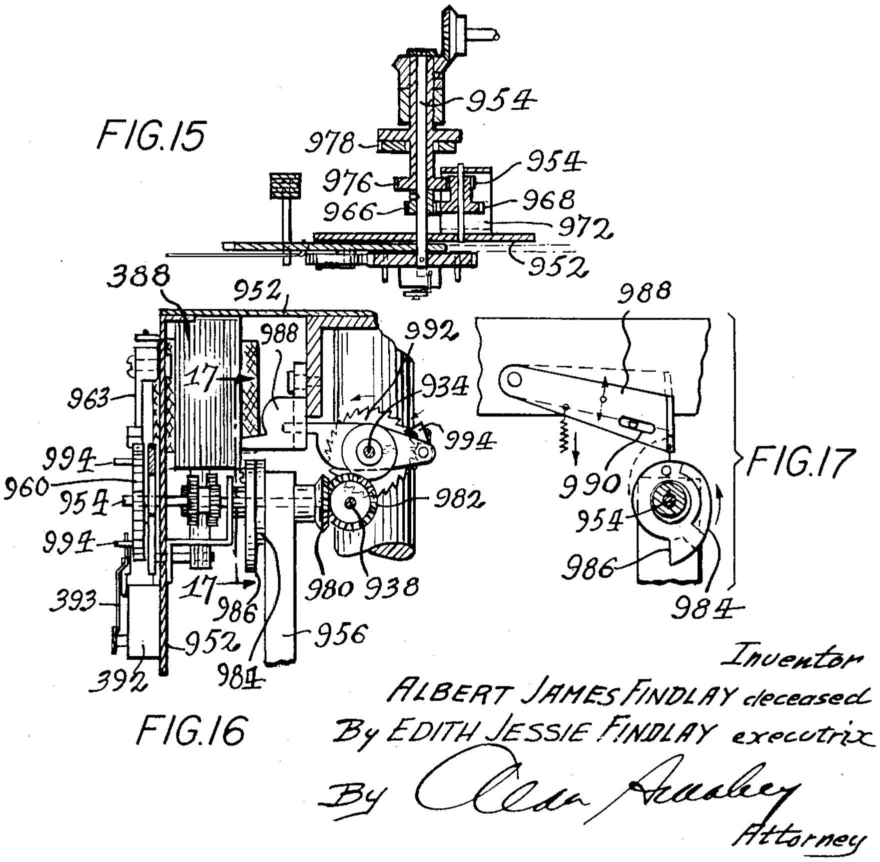
Figure 15 is a cross-sectional view of Figure 14 along the line 14—14 to illustrate the gear reduction between the minute drive portion and the hour portion of the printing apparatus.
Figure 16 is a cross-sectional view of Figure 14 along the line 16—16 to illustrate the change-over cam transferring the hour change in sequence.
Figure 17 is a partial detail view of the changeover cam and actuating lever indicated at 17—17 on Figure 16.

In order to more clearly describe the construction and operation of the punch rack advancing coils reference will first be made to the construction and assembly of the punch supporting racks. In the construction illustrated there are six (6) punch supporting racks designated as 800, 801, 802, 803, 804 and 805. The four racks 800, 801, 802, 803, are advanced by selector means controlled by the master motor 370 while the racks 804. 805, are manually selected, as will be explained later. Since the racks are all of the same construction, particular reference will be made to Figures 27 through 31 showing the typical rack 802 in detail. The rack 802 is of overall rectangular outline having a guiding portion 810 of reduced thickness at the rear end and an outstanding guiding boss 812 at the front end. As shown in Figures 9, 10, 13, the racks are mounted in juxtaposed relationship for sliding movement transversely to and across the base plate 120 with the guiding portions 810 fitting between the spaced teeth 850 of a guide plate 852 mounted at the rear of the apparatus frame with the front guiding bosses 812 slidably fitting into the slots 854 of a bottom guide plate 856. In this manner the racks are positioned and aligned for sliding movement beneath the press plate assembly so that the perforating punches carried in the racks are depressed into punching contact with the card as it proceeds along the card guiding path.

Each perforating punch indicated at 857 in the construction shown is of rectangular cross-section and is slidably fitted in a corresponding rectangular recess 858 provided in the end of each rack. The upper end of each punch extends through the spaced aligned slots 860, 861, provided in the upper 60 and lower punch guide plates 64 respectively. The corresponding slots 854 provided in the lower base plate 856, upon which the racks slide, provide clearance for the punchings. As shown most clearly in Figure 27, each punch supporting rack includes an internal card accommodating slot, indicated at 807 in the rack 802, which intersects the rectangular recess 858 so that the lower portion of the rack below the recess 858 acts as a die in combination with the punch 857. The slots 807 in the respective racks are aligned so that their lower surface forms a substantial continuation of the card supporting base plate 120.

Since, in the construction illustrated, there are four (4) punch supporting racks 800, 801, 802 and 803 advanced by the synchronous motor minute pulse; there are second 377, third 378 and fourth 379 punch rack advancing coil assemblies in addition to the first coil assembly 376. As the construction and operation of all of these coil assemblies and their associated mechanism for advancing the respective racks is identical, reference will be made only to the coil assembly 378 shown in detail in Figures 27 through 31.

Figures 26, 27, 28, 29, 30, 31:
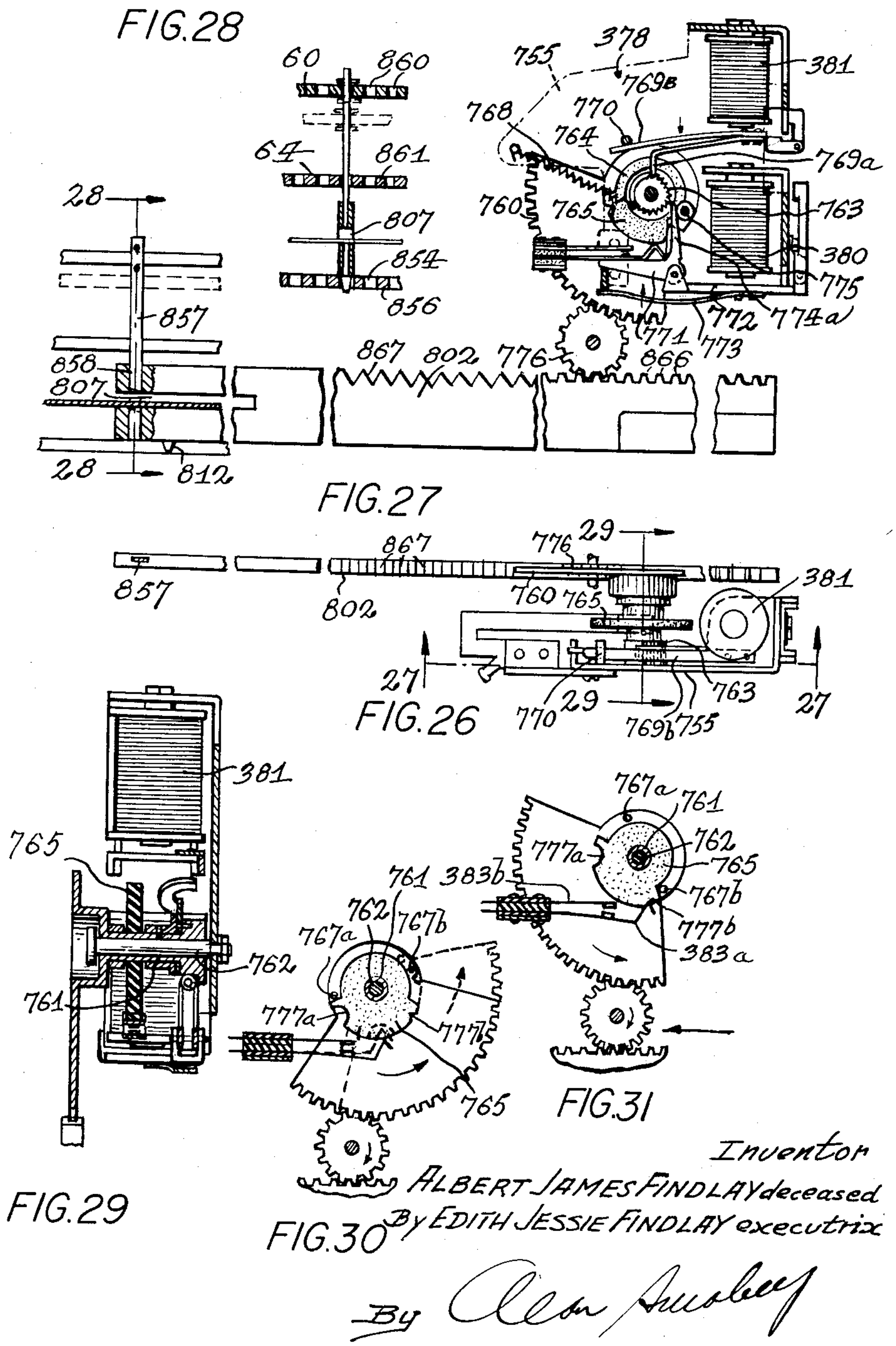
Figure 26 is a top plan view of a typical punch rack selector arrangement.
Figure 27 is a side view of the arrangement shown in Figure 26 along the line 27—27 illustrating the relative position of the rack, rack drive, ratchet wheel, and associated punch.
Figure 28 is a sectional view of Figure 27 along the line 28—28 showing the relative positions of the punch, punch supporting die, die guide and pressure plate.
Figure 29 is an enlarged sectional view of Figure 26 along the line 29—29 showing the construction of the rack driving mechanism in more detail.
Figure 30 is a diagrammatic view of the re-set cam of the rack drive ratchet wheel and associated switch with the cam in tenth or re-set position.
Figure 31 is a diagrammatic view corresponding to Figure 30 showing the cam during its travel between the zero and tenth position.

The coil assembly 378 includes an actuating coil 380 which is mounted on a bracket 755 in axially aligned spaced apart relationnhip with a release coil 381. Also mounted on the bracket 755 for free rotation is an arcuate toothed segment 760 which, as shown in Figure 29, is shaped so as to have a hollow shaft extension 761 through which a bolt 762 passes to attach it to the bracket 755. A partially toothed ratchet gear 763 is mounted on and is keyed to the extension 761 for rotation therewith and a counter cam 764 of insulating material is also mounted on the extension 761 for free rotation relative thereto. The cam 764 is shaped, as shown in Figures 30, 31, so as to have a first arcuate peripheral portion 765 between two stop portions 766*a*, 766*b* and pins 767*a*, 767*b*, provided on the segment 760 are adapted to engage the cam stop portions to respectively advance and return the cam in a counter-clockwise direction.

The ratchet gear 763 and consequently the segment 760 are spring biased to rotate in a clockwise direction by a coil spring 768 and are normally held against such rotation by a spring detent pivotally mounted on the bracket 755. The spring detent includes a bent-over gear tooth engaging portion 769*a* and a flat spring arm 769*b* which bears against a pin 770 extending from the support bracket 755 to normally maintain the portion 769*a* in resilient engagement with the teeth of the ratchet gear 763. The detent 769 is positioned directly beneath the release coil 381 and energization of this coil raises the portion 769*a* from the gear 763 and allows it to return to its original position as will be described later.

A two armed ratchet gear advancing lever 771 is pivotally mounted on an actuating plate 772 directly beneath the ratchet gear 763. The actuating plate 772 in turn is pivotally mounted at one end to the bracket 755 directly beneath and under the control of the actuating coil 380. A leaf spring 773 is attached to the plate 772 at one end with the other end bearing against a portion of the bracket 755 to normally urge the plate 772 away from the coil 380. One arm 774*a* of the lever 771 is directed towards and is guided into engagement with the teeth of the ratchet gear 763 by a roller 775 on each upward movement of the plate 772 through the coil 380. The other arm 774*b* of the lever 771 contacts the portion of the bracket 755 against which the spring 773 bears so as to tilt the arm 774a clear of the ratchet gear 763 on the release of the plate 772. With this arrangement, each minute impulse delivered to the actuation coil 380 causes a corresponding movement of the ratchet gear 763 advancing it a single tooth by the lever arm 771. As the ratchet gear 763 is connected directly to the arcuate segment 760 this is also rotated the distance of a single tooth and, through an idler gear 776, the movement is transmitted to the teeth of the rack 802 advancing it a single tooth or space.

As will be appreciated, since the present arrangement is designed to record time in accumulative minutes in decimal readings it is necessary, once the first rack has been advanced to a point where its punch is in position to record a nine (9), that this punch be returned to zero and the next rack be activated and so on. This is accomplished by the cam disc 764 which, to compensate for the difference in circumference relative to the ratchet gear 763, is not initially advanced by the movement of the gear 763 until the pin 767a engages the stop portion 766a. The outer or cam surface 765 of the cam disc 764 includes two circumferentially spaced apart cam recesses 777a, 777b, and the lower contact arm 383a of a switch assembly 384 resiliently rides on the periphery 765 of the cam disc 764 and is adapted to fall into the cam recesses 777a, 777b, at the beginning and end of the travel of the cam 764. The position of the cam recess 777a relative to the ratchet gear 763 is such that on the 10th digit or minute impulse to the coil 380 the switch contact arm 383a falls into the recess 777a and makes contact with the switch portion 383b. This closes the circuit to the release coil 381 and the ratchet gear 763 is released so that the rack 802 is returned to zero position. The 10th digit impulse also actuates a synchronization control arrangement, to be described in more detail later, and through the control arrangement passes to the next actuating coil assembly to actuate the next rack to one (1) position which with the first rack now in zero position gives a punch location of 10.

*Synchronization control arrangement*

As previously mentioned, the closing of the micro-switch 372, by the movement of the synchronous motor on every minute impulse, sends an energizing impulse to the coil assembly 378. At the same time a "minute finder" control solenoid 386 and a further solenoid 388 are energized, the operation of the minute finder control solenoid 386 being necessary to permit the advance of the punch supporting racks.

In order that the punches be advanced the exact amount to correspond with the markings of the time card and be exactly aligned for the punching operation the apparatus is provided with the following "minute finder" arrangement. As shown most clearly in Figures 10 and 12, a tooth engaging bar 862 is mounted between lever arms 863, which in turn are pivotally mounted at one end to supporting standards 864, so that the bar 862 is disposed transversely to and over the teeth of the aligned racks 800, 801, 802, 803, 804, 805. It should be mentioned that each rack is provided with two sets of teeth, one set indicated at 866 on the rack 802, shown in Figure 27 for example, meshing with the teeth of the idler gear 766, while the other set indicated at 867 being adapted for engagement by the bar 862.

To permit the synchronized movement of the punch supporting racks the bar 862 is raised on each minute impulse and then returned to its original position engaging the next successive tooth 867 as the rack is advanced. The movement of the bar 862 is accomplished through the lever arm 870 pivotally connected at the lower end to one of the lever arms 863. The upper end of the lever arm 870 includes a toothed segment 871 which is in meshed engagement with the correspondingly toothed end of a flat lever plate 872. The lever plate 872 is mounted on a shaft 873 supported for rotation on the upper part of the apparatus frame between supporting standards and a rocker lever arm 874 fixed to the shaft 873 is pivotally connected to the plunger of the solenoid 386 by a link bar 875. Accordingly on the action of the solenoid 386 and through the linkage described the bar 862 is momentarily raised from engagement with the respective teeth 867 of the aligned racks. A micro-switch 387 is also operated by the raising of the bar 862 and permits the impulse to proceed to the first punch advancing coil. When it is desired to completely reset the apparatus the bar 862 can be manually raised through a reset bar 869 also mounted on the shaft 873.

The simultaneous energization of the solenoid 388 acts to move the printing wheels of the time recording printing mechanism of the apparatus, as will now be described in more detail.

Figures 32, 33, 34, 35, 36:
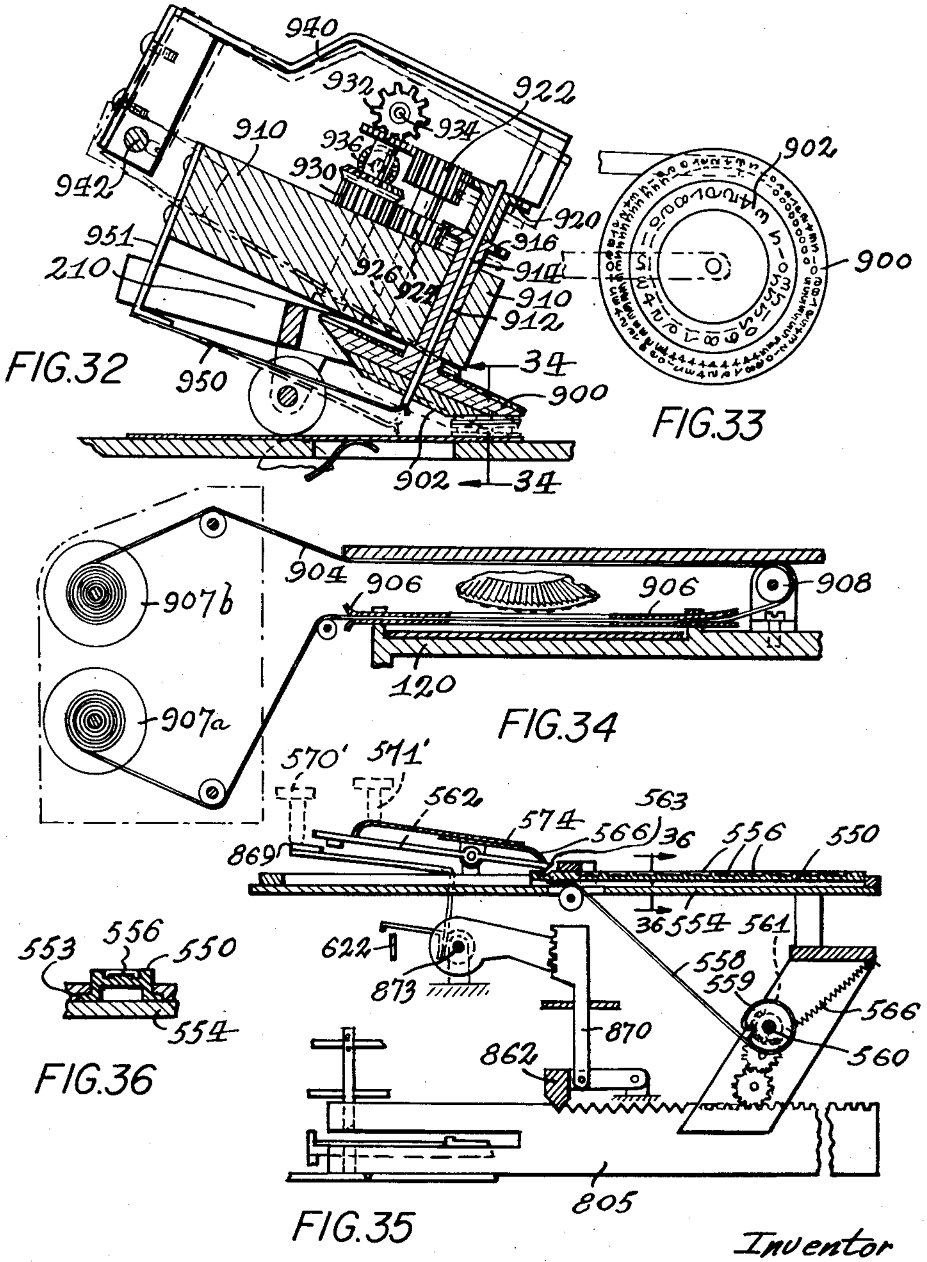
Figure 32 is a detail view in cross-section of the printing mechanism including the type wheels and driving mechanism.
Figure 33 is a face view of the concentric type wheels showing their relative positions as shown in Figure 32.
Figure 34 is a sectional view of Figure 32 along the line 34—34 and including a diagrammatic showing of a typical ribbon mounting arrangement and ribbon shield.
Figure 35 is a section of the construction shown in Figure 4 along the line 35—35 to illustrate in more detail the operating mechanism for the data punch selecting portion of the apparatus.
Figure 36 is a sectional view of Figure 35 along the line 36—36 showing a typical data selector slide and guiding channel.

The printing portion of the apparatus, by means of which a visual record in hours and minutes over a 24 hour period is printed, includes two concentric type bearing wheels 900, 902, having bevelled printing surfaces which are adapted to come into contact with the card as it is supported on the card supporting base 120, see Figures 32, 33, 34, for details. As is shown most clearly in Figure 34 a ribbon 904 is fed over the card and between the card and the type wheels 900, 902, and is guided between spaced ribbon guides 906 and about a roller 908 mounted on the card supporting base 120. The ribbon is wound on two typewriter type ribbon rolls 907a, 907b, which are rotated in the usual manner on each reciprocal stroke of the elongated lever 652 actuated by the stroke of the punch presser plate lever arm 628. This construction is illustrative only and it will be appreciated that other known types of ribbon advancing mechanism could be utilized.

The printing wheels 900, 902, are mounted on a supporting base or block 910 for restricted axial printing movement towards and away from the card and for time controlled rotary movement relative to each other. The minute indicating wheel 900 is mounted directly on a hollow shaft 912 mounted for sliding axial movement in the block 910. The hour indicating wheel 902 is mounted on a shaft 914 mounted for rotation within and extending through the hollow shaft 912. The upper end of the shaft 912 is formed to provide a gear 916 and a further hollow shaft portion 918, forming a substantial but separate continuation of the shaft 912, is provided with a gear 920 and is connected to the inner shaft 914. Accordingly, the respective type wheels 900, 902, are adapted for individual rotation by the gears 916, 920, and combined axial movement relative to the supporting block 910.

The drive to the gears 916, 920, is imparted through a pair of idler gears 922, 924, mounted for individual free rotation on a shaft 926 supported in the block 910. In order to achieve the desired amount of rotation to compensate for the difference in diameter of the wheels 900, 902, a further set of idler gears namely, a gear 928 in meshed engagement with the gear 922, and a combined bevel and plain gear 930 in meshed engagement with the gear 924, are mounted on a shaft 927 also supported in the block 910. The drives to the respective gears 928 and 930 are through a sprocket gear 932 mounted on one end of a shaft 934 extending across the apparatus to the printing arrangement and a bevel gear 936 mounted on a corresponding shaft 938. The shafts 934 and 938 are driven by the energization of the solenoid 388 as will be described in detail later.

The meshed engagement of the gears 916, 920, with the gears 922, 924, is such that the drive is maintained during the axial printing movement of the type wheels. This movement is accomplished by the depression of a depressor bar 940 mounted on a shaft 942 which is rotated through an elongated lever arm 944 extending from the plunger of a further solenoid 390. The lever arm is resiliently biased for its return movement by a coil spring 948, as shown most clearly in Figure 5. The printer solenoid 390 is energized by the actuation of a microswitch 391 operated by the movement of the elongated lever 652 operating the printing ribbon advance. A spring 950, secured to an extension 951 of the block 910, bears against the end of the shaft 914 so as to return the type wheels to normal position.

As shown most clearly in Figures 14 through 17 the drive from the solenoid 388 to the printing wheels is accomplished by the following arrangement. The solenoid 388 is mounted on a supporting plate 952 and a shaft 954 is journalled between the plate 952 and a supporting standard 956. An elongated lever arm 958 is freely mounted on the shaft 954 with one end 955 connected by a pin and slot arrangement 959 to the plunger of the solenoid 388. A ratchet gear 960 is fixedly mounted on the shaft 954 and a resiliently biased ratchet pawl 962 is pivotally mounted on the lever 958 for engagement with the teeth of the gear 960. An arresting pawl 963, resiliently biased by a spring 963*a*, is pivotally mounted on the plate 952 and is engaged with the gear 960 to prevent back slip. With this arrangement, actuation on each minute of the solenoid 388 produces a corresponding pivotal movement of the lever arm 958 and consequently a single tooth rotary movement of the gear 960. The extreme end of the lever arm 958 extends across the apparatus and contacts and operates the actuating arm of the minute counting indicator 104.

The rotational drive to the shaft 954 must of course be regulated to give the necessary proportional turning speed to the shafts 934 and 938 driving the printing wheels. For this purpose a first gear 966 is fixed directly to the shaft 954 and is in meshed engagement with a gear 968 mounted on an idler shaft 970 journalled in a bracket 972 secured to the plate 952. A smaller gear 974, common to the gear 968, is in turn in meshed engagement with a gear 976 secured to the lower end of a sleeve 978 mounted for free rotation on the shaft 954. The sleeve 978 extends through the standard 956 and a bevel gear 980 is keyed to its protruding end for rotation therewith. The bevel gear 980 is in meshed engagement with a further bevel gear 982 secured to the minute drive shaft 938.

In order to provide the single rotation to the hour drive shaft on every sixty rotations of the minute drive shaft, the sleeve 978 is also provided with a cam 984 having a cam recess 986. A lever arm 988 is pivotally mounted on a support 990 directly above and is resiliently biased towards the cam 984 so that on each complete rotation, corresponding to sixty minutes, the end of the lever arm 988 falls into the cam recess 986. This movement is transmitted to the end of a pawl lever 990, which fits through a slot 991 in the cam lever arm 988, so that the pawl lever is pivoted about an axis constituted by the end of the hour drive shaft 934. A ratchet gear 992 is fixedly mounted on the shaft 938 and is engaged by a ratchet pawl 994 pivotally mounted on the end of the pawl lever 990. Accordingly, on each complete rotation of the minute drive shaft 938, corresponding to sixty (60) minutes, the hour drive shaft is rotated an amount sufficient to advance the hour type wheel 902 one (1) hour. The ratchet gear 992 is provided with 24 teeth corresponding to the 24 hour printing type of the hour type wheel 902.

The movement of the ratchet gear 960 is also utilized to synchronize the movement of the punch supporting racks with the printing wheels. As shown most clearly in Figure 14, there are three (3) pins 994 protruding from the face of the gear 960 and these in turn contact and actuate the arm 393 of a synchro contact switch 392 at regular ten minute intervals. If the rack advancing mechanism and printing mechanism are in step on the 10th impulse the circuits are closed and the release coils will operate to reset the coil assembly to zero and activate the next coil assembly. However, if they are not in step the punch rack mechanism will not operate until the 10th impulse, represented by the contact of one of the pins 994 with the switch arm 393, is reached by the printing mechanism. This is accomplished by a separate relay which will be described later in the explanation of the circuit diagram.

*Manually operated data recording punches*

The punch supporting racks 804, 805, retain the manually selected perforating punches whereby supplementary code data is punched on the cards, for example, job numbers or the like, simultaneously with the time recording punches. The construction of the racks 804, 805, is identical to that previously described in connection with the rack 802 and since the racks 804, 805, are disposed in juxtaposed alignment with the time operated racks 800, 801, 802, 803, the punches carried by the racks 804, 805, are also depressed into punching contact with the card through the presser plate assembly.

Figure 4:
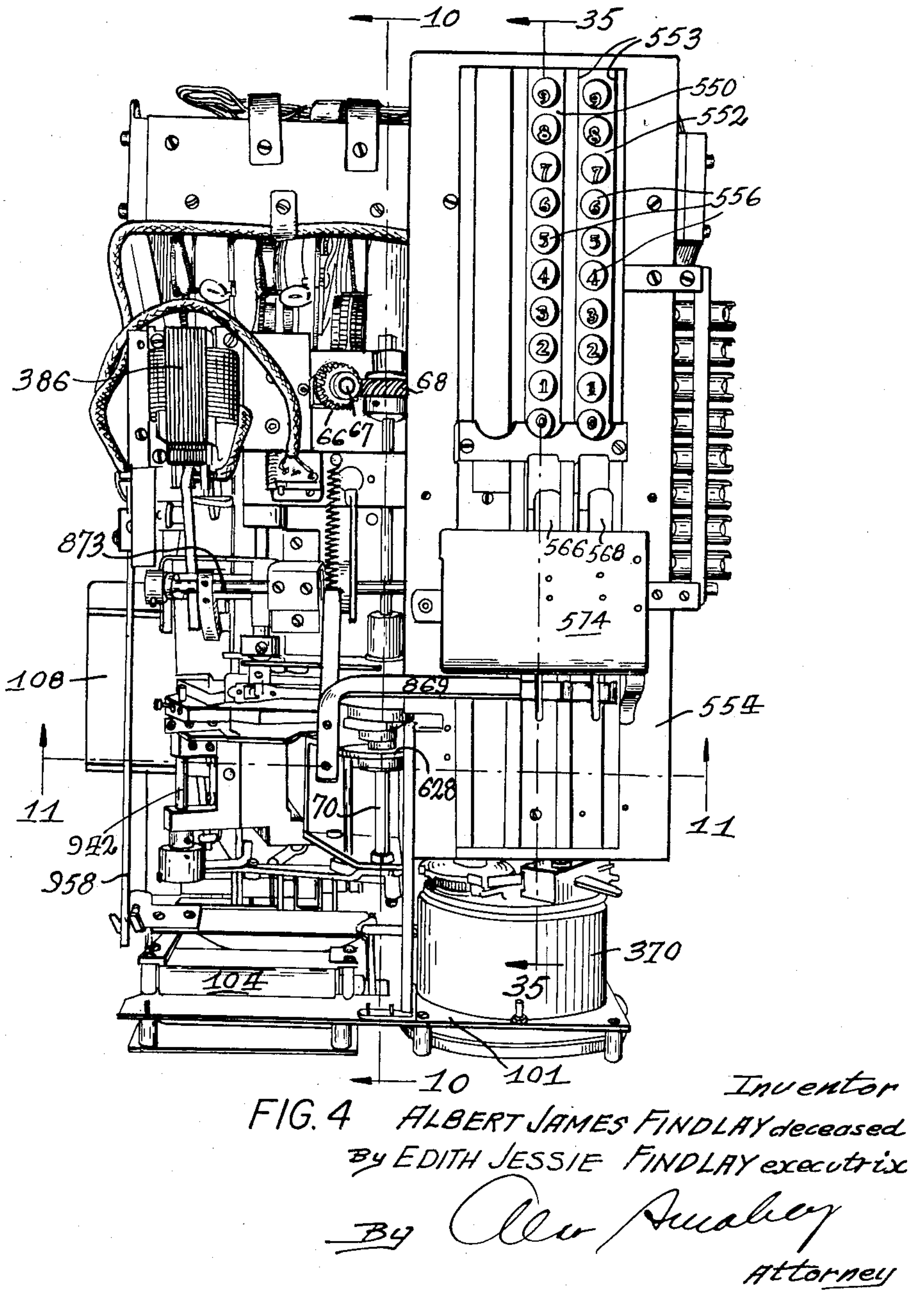
Figure 4 is a top plan view of the apparatus construction shown in Figure 1 with the cover removed to show the internal arrangement more clearly.

The punch supporting racks 804, 805, are manually moved to the desired data indicating positions through indexing slide plates 550, 552, mounted in channels 553 on the upper frame 554 of the machine in juxtaposed relationship so as to be readily accessible through the indexing opening or window 103 provided in the casing 100, see Figures 1 and 4. As is shown most clearly in Figure 4, there are two (2) indexing slide plates and associated punch supporting racks shown in the present construction by way of illustration and it will be appreciated that additional slide plates and racks could be added if it were desired to record designating data of more than two (2) digits.

As best shown in Figure 35, each slide plate 550, 552, is mounted for free sliding movement in a channel 553, see Figure 36, and the upper surface of each plate is provided with an aligned series of finger engageable recesses 556 each bearing a digit number from 0 to 9. The end of each slide plate, 550 as shown, bearing the starting digit 0, is connected at one end to an elongated flexible steel strap 558 wound about a drum 559 mounted on and secured for rotation on a hollow shaft 572 mounted over a shaft 560, see Figure 13. The shaft 560 is journalled for rotation between supporting plates 562, 564, extending from the machine frame. A spring 566 extends from the machine frame to a smaller drum 561 extending from the side of and secured to the drum 559 so that rotation of the drum 559 in one direction by the unrolling of the strap 558 causes a winding or tension of the spring 566. On release of the plate 550 the spring 566 acts to rewind the tape 558 and return the slide plate 550 to its starting position. A similar arrangement is provided for the slide plate 552 which is connected by a tape 568 to a drum 570 which with a spring drum 571 is mounted directly on the shaft 560. A spring 573 is connected between the drum 571 and the frame of the machine.

In order to maintain the slide plates 550, 552, in the desired selected positions a plate 574 is pivotally mounted on the frame portion 554 directly over a pair of pivotally mounted engaging fingers 560, 562, see Figure 35. One end of each of the fingers 560, 562, is shaped to provide a substantially hook-shaped detent 563 which engages with the selected recess 566. Flat springs 567, 568, are mounted on the plate 574 to extend outwardly and downwardly therefrom into resilient bearing contact with the fingers 560, 562.

With reference to Figure 13, the drive from the shaft 560 under the rotation of the drum 570 is transmitted to a gear 580 and from the gear 580 to an idler gear 581. The idler gear 581 is mounted on a shaft 582 journalled in the supporting plate 562 and in turn is in meshed engagement with a gear 583 provided on one end of a hollow shaft 584. The hollow shaft 584 is mounted for rotation on a further hollow shaft 586 and is provided at the other end with a further gear 588 in meshed engagement with the punch supporting rack 805. The drive from the drum 559 is transmitted through the hollow shaft 572 to a gear 590 and from the gear 590 to an idler gear 592 also mounted on the shaft 582. The idler gear 592 in turn is in meshed engagement with a gear 594 on one end of the hollow shaft 586 and a further gear 596 on the other end of the shaft 586 is in meshed engagement with the driving teeth of the punch supporting rack 804.

The hollow shaft 586 is mounted for rotation on an elongated hollow shaft 591 and the shaft 591 has a driving gear 595 on one end in driving engagement with the punch supporting rack 803 and a further gear 593 on the other end of the shaft 591 is contacted and driven by the arcuate segment 760 of the coil assembly 379. The hollow shaft 591 is mounted for rotation on an elongated shaft 597 which extends across the width of the apparatus between the sides of the frame. To complete the explanation of the drives shown in Figure 13, the idler gear 776 driving the rack 802 is mounted directly on the shaft 597. A hollow shaft 598 carrying the gears 535, 536, driving the rack 801 from the coil assembly 377 is mounted on a hollow shaft 537. The hollow shaft 537 is mounted on an elongated hollow shaft 538 carrying the gears 539, 540, driving the rack 800 from the coil assembly 376, and the hollow shaft 538 is mounted on the common elongated shaft 597. In this manner the individual drives from the time regulated coil assemblies and the manually actuated slides are brought together in aligned sequence directly over the punch supporting racks 800, 801, 802, 803, 804, 805.

It should be mentioned that the "minute finder" bar 862 also acts to accurately locate the punches of the manually advanced punch supporting racks 804, 805, in a similar manner as previously described in connection with the racks 800, 801, 802, 803, see Figures 10, 12 and 35. Accordingly, the bar 862 must be first raised from engagement with the teeth 867 of the racks 804, 805, before the required data digits are dialed by the slide plates 550, 552. This is accomplished by first depressing a "Dial" button indicated at 570' which extends through the top of the casing or housing 100 into contact with the reset bar 869, see Figure 35. Further, in order to reset the slides 550, 552, for the next punching, a "Reset" button indicated at 571' also includes a portion extending through the housing 100 into contact with the plate 574. As the plate 574 is pivotally mounted and positioned directly over the fingers 560, 562, and the reset bar 869, depression of the "Reset" button 571 releases the punch racks from the bar 862 and the slides 550, 552, from the retaining fingers 560, 562, see Figure 35.

*Circuit*

Figure 37:
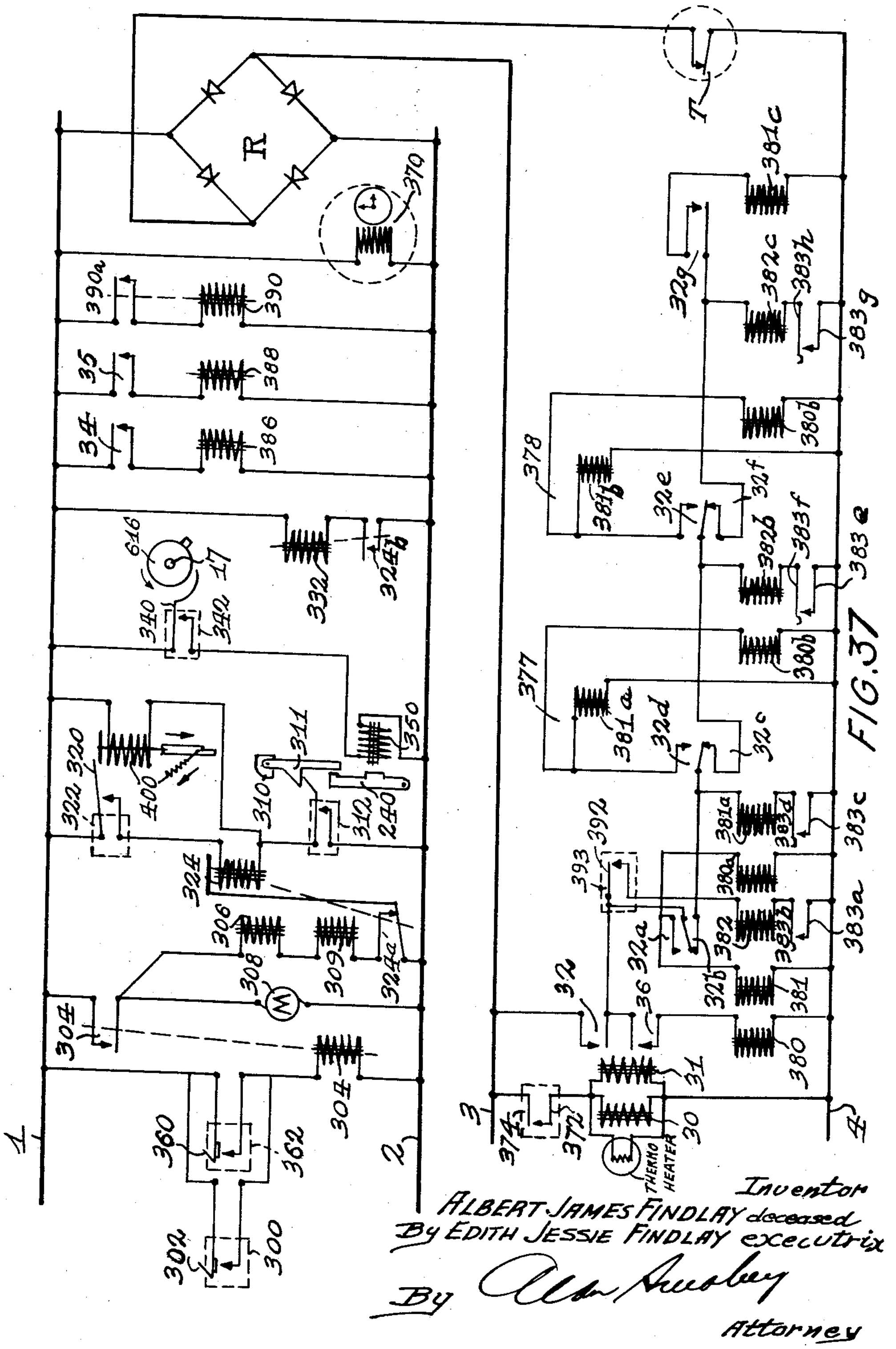
Figure 37 is a circuit diagram of the apparatus shown diagrammatically with the main elements positioned in the same relative spacing as in the actual construction.

In order that the circuit controlling the various operations previously described may be more clearly understood, reference is made to Figure 37.

With reference to this figure when a card is inserted into the card receiver 106 a first card contact member 302 is actuated so that the switch 300 completes the circuit via line 1 to the contact of relay 304 to line 2. The operation of relay 304 closes the contact 304' actuating the motor 308 via lines 1 and 2 and also operates rollers by energizing the roller solenoids 306, 309. The contact 324a is closed to the line 2.

Operation of the roller solenoids 306, 309 causes the card to be driven forward until the leading edge depresses the toggle arm 310 thereby closing the toggle switch 312. Operation of the toggle switch 312 energizes the sensing coil 400 causing the sensing pin 402 to apply a light pressure on the card. When the card has advanced, as previously described, the sensing rod 402 passes through a pre-punched hole in the card, and as a result, the sensing rod 402 will operate or descend through the coil and thereby close the sensing switch 322.

The closing of the sensing switch 322 operates the relay 324 opening the contact 324a thereby breaking the circuit to the roller solenoids 306, 309, so that the driving rollers are removed from contact with the card and the card is arrested from further movement.

Operation of the relay 324 also closes the contact 324b completing the circuit to the clutch magnet 332. Since the motor 308 is continuously running, and as a result of the clutch mechanism operating the punch mechanism, the clutch mechanism completes the cycle so that the card is perforated. At the completion of the cycle the clutch cam 616 has revolved a complete turn and just prior to the completion of this cycle the cam lug contacts and momentarily closes the kick-off switch arm 340 controlling the kick-off switch 342 which operates the kick-off coil 350.

The operation of the kick-off coil 350 actuates the pivotal arm 240 thereby moving the latch portion 311 away from the toggle switch 312 opening the circuit releasing the sensing coil 400 and the relay 324.

When the relay 324 is restored to normal, the contact 324b opens and locks the clutch to prevent a second cycle of the punch mechanism. The closing of the contact 324a again energizes the roller solenoids 306, 309 so that the card is again driven forward.

The forward movement of the card permits the leading edge to operate the card contact arm 360 controlling the switch 362 before the trailing edge of the card is completely released from contact with the arm 300 of the switch 302. Therefore the card is advanced to ejecting position and opens the switch 362 and restores the relay 304 to normal, stopping the motor 308.

It should be mentioned at this point and with reference to the upper portion of the diagram shown in Figure 37, that in addition to the circuit described above the A.C. lines 1 and 2 are also connected to the minute finding coil or control solenoid 386, the solenoid 388, the printing actuation solenoid 390 and the master synchronous motor or clock 370.

From this circuit a rectifier R is introduced to supply the necessary D.C. lines 3, 4 for the operation of the minute drive circuits.

As previously explained in detail, the minute pulse is operated from the master clock 370, the contact arm 374 actuating the switch 372. Closing of the switch 372 operates the relays 30 and 31 closing the contact switch 32 and completing the circuit to the actuating solenoid or coil 380 of the first punch advancing coil assembly 376.

The simultaneous operation of the relay 31 with the relay 30 also closes the contacts 34 and 35. The operation of the contact 34 energizes the minute finder solenoid 386 thereby releasing it from its normally locked position. The operation of the contact 35 completes the circuit to the minute impulse solenoid 388 which drives the printing type wheels.

Upon full operation of the minute finder solenoid 386 the micro-switch 36 opens and releases the No. 1 solenoid or coil 380 of the coil assembly 376 thereby providing a quick operation of the first punch advancing rack.

When the number 1 digit coil 380 has been actuated to the position where the rack is advanced to ninth (9) position, the digit cam, 765 for example as shown in Figure 27, is being prepared to return the rack to zero position when the next or tenth impulse is transmitted. As previously described, the descent of the contact arm 383a of the switch assembly 384 into the recess 777a of the cam 765 closes the circuit to the relay coil 382. However, the circuit is not complete unless the switch 392 by the switch contact member 393 is in closed position under the control of the 10 minute synchronization contact arrangement.

As previously described the gear 960 includes 3 pins

394. These in turn contact and actuate the arm 393 of the switch 392 at regular 10 minute intervals. The purpose of this feature is to provide means, as described, to keep the type wheels of the printing arrangement and the punch racks in synchronism. The relay 382 will not operate unless the switch 392 completes the circuit.

Assuming the circuit is complete the relay 382 closes the switch 32*a* via the switch 32 to operate the No. 1 reset coil 381 so as to restore the cam 765 and the rack 800 to zero and also transmitting one impulse to the No. 2 punch advancing coil 380*a*. The operation of the release coil 381 is fast relative to the duration of contact of the relay 30, therefore the respective pin 994 of the gear 960 releases the switch arm 393 to operate the switch 392 restoring the relay 381*a* to normal. The contact 32*b* is again closed and the next impulse through the contact 32 will pass to the solenoid 380*a* via 36*b*.

The operation of the other punch advancing coil assemblies 377, 378, 379, is similar and is in the form of a cascade circuit. When the number 4 reset coil 381 operates, all racks or digits will be at zero (0000). The punch advancing coils 380*a*, 380*b* and 380*c*, are again reset by the reset coils 381*a*, 381*b*, 381*c*, when each successive assembly reaches the next 10 digit point under the control of the respective relays 382*a*, 382*b*, 382*c*, providing the 10 minute synchronization arrangement is in step as previously described. In each case the respective contacts 32*c*, 32*d*, 32*e*, 32*f*, and the single contact 32*g* on the number 4 coil assembly 379 operate as described in conjunction to transfer the 10th impulse to the next successive coil assembly.

As a safety factor a vacuum theremo contact T is incorporated in the rectifier circuit for the purpose of protecting the advancing and reset coils of the punch advancing mechanism in the event of a master clock system failing at the instant of impulse or from any other outside hazard.

It is claimed:

1. In an electrically operated card punching apparatus having a casing and extending within and through said casing, a guideway for receiving a card preperforated with a locating perforation, card advancing means adapted to convey said card in a continuous and single direction through said guideway, sensing means adapted to sense said card locating perforation, card actuated control means for said card advancing means and said sensing means, card punching means including a plurality of recording punches for recording time data and at least one additional punch for punching a successive locating perforation in said card, and control means associated with said sensing means adapted first to render said card advancing means inoperative and in succession to actuate said card punching means and re-actuate said card advancing means; means for recording additional code data on said card comprising a further plurality of recording punches, and manually operable punch selecting means including a plurality of indicia bearing plates mounted for sliding movement on the upper portion of said apparatus in aligned juxtaposed relationship, an access opening in said casing in alignment with said indicia bearing plates, slide arresting means adapted to individually retain said slides at a manually selective position bringing one of said indicia in alignment with a common registering point, and linkage means operatively connecting each of said slides with one of said data recording punches, said further plurality of punches being actuated simultaneously with said time recording and locating punches under the control of said control means associated with said sensing means.

2. An electrically operated card punching time recorder adapted for use with a time card having at least one prepunched locating perforation, comprising in combination, a housing, a card receiver extending through said housing, card advancing means including card advancing rollers adapted to engage and convey said card along the length of said card receiver, a driving motor connected to said card advancing rollers and to a control relay, a first switch means disposed in the path of said receiver and connected to said control relay, a first plurality of time recording punches mounted for reciprocal movement into the path of said card receiver, a second plurality of data recording punches mounted for reciprocal movement into the path of said card receiver adjacent to said first plurality of punches and at least one fixed card locating punch located above said receiver in spaced apart relationship from first and second plurality of punches, time controlled electrically operated punch selecting means acting on said time recording punches, manually operated punch selecting means acting on said data recording punches including a plurality of indicia bearing plates mounted for sliding movement on the upper portion of said apparatus in aligned juxtaposed relationship, an access opening in said housing in alignment with said indicia bearing plates, common punch aligning means acting on said time recording and data recording punches, punch actuating means connected to said control relay and adapted to simultaneously act on said first and second punches and card locating punch, card locating means including a reciprocating electrical armature and sensing rod adapted to engage with a card passing through said card receiver and locate said card relative to said punches by engagement with said prepunched perforation, a second switch means connected to said control relay and disposed in the path of said armature, said second switch means adapted on engagement by said sensing rod to release said punch actuating means, whereby said card is moved into said time recorder, located and punched to provide a plurality of spaced perforations indicating a code time record, designating data for said time record and a subsequent card locating perforation.

3. An electrically operated time recorder for producing a record of elapsed time and designating data for said time record on a card in punched form suitable for subsequent evaluation by a tabulating machine, comprising in combination, a casing, a card receiver extending through said casing, a card advancing means adapted to engage and convey said card along the length of said card receiver, a control relay connected to said card advancing means, switch means in the path of said card receiver and connected to said control relay, a plurality of punch supporting racks mounted for sliding reciprocal movement relative to and transversely across the path of said card receiver, a corresponding plurality of perforating punches, one slidably mounted in each of said punch supporting racks, punch selector means connected to and adapted to move said racks relative to said card receiver, including time controlled electrically operated punch selecting means acting on certain of said supporting racks, a manually operated punch selecting means including a portion accessible from the exterior of said casing and acting on others of said punch supporting racks, punch aligning means acting on all of said punch supporting racks, punch actuating means mounted above the portion of said card receiver intersected by said punch supporting racks and connected to said control relay, and card engaging and sensing means connected to said control relay adapted to engage with a card passing along said card receiver and through said control relay and in sequence locate and arrest said card relative to said supporting racks and actuate said punch actuating means.

4. An electrically operated card punching time recorder as claimed in claim 2, including printing means disposed above and in the path of said card receiver and adapted to print a visual record of elapsed time on said card in step sequence with said time recording punches, said printing means being actuated into printing engagement with said card by said punch actuating means.

5. An electrically operated card punching time recorder as claimed in claim 3, including printing means disposed above and in the path of said card receiver and adapted to print a visual record of elapsed time on said card in step sequence with said time recording punches, said printing means being actuated into printing engagement with said card by said punch actuating means.

References Cited in the file of this patent

UNITED STATES PATENTS

| | | |
|---|---|---|
| 1,219,912 | Bryce | Mar. 20, 1917 |
| 1,473,554 | Hill | Nov. 6, 1923 |
| 1,914,388 | Pein et al. | June 20, 1933 |
| 2,110,854 | Fuller et al. | Mar. 15, 1938 |
| 2,307,128 | Harrison | Jan. 5, 1943 |
| 2,356,995 | Gollwitzer | Aug. 29, 1944 |
| 2,421,697 | Hobby | June 3, 1947 |
| 2,645,551 | Sprecker | July 14, 1953 |
| 2,756,824 | Braun | July 31, 1956 |
| 2,838,361 | Findlay et al. | June 10, 1958 |

FOREIGN PATENTS

| | | |
|---|---|---|
| 760,531 | Germany | Feb. 22, 1954 |